United States Patent
Elshafie et al.

(10) Patent No.: US 12,500,697 B2
(45) Date of Patent: Dec. 16, 2025

(54) CODED SIDELINK FEEDBACK FOR IMPROVED RELIABILITY

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/953,180

(22) Filed: Sep. 26, 2022

(65) Prior Publication Data

US 2024/0106570 A1   Mar. 28, 2024

(51) Int. Cl.
*H04L 1/00* (2006.01)
*H04L 1/20* (2006.01)
*H04W 76/14* (2018.01)

(52) U.S. Cl.
CPC .......... *H04L 1/0073* (2013.01); *H04L 1/0013* (2013.01); *H04L 1/201* (2013.01); *H04W 76/14* (2018.02)

(58) Field of Classification Search
CPC ..... H04L 1/0073; H04L 1/0013; H04L 1/201; H04W 76/14
USPC .................................................. 714/748–750
See application file for complete search history.

(56) References Cited

U.S. PATENT DOCUMENTS

| | | | |
|---|---|---|---|
| 2013/0010690 A1* | 1/2013 | Cheng | H04L 1/1607 370/328 |
| 2020/0022089 A1* | 1/2020 | Guo | H04W 52/242 |
| 2020/0029318 A1* | 1/2020 | Guo | H04L 5/0055 |
| 2020/0267597 A1* | 8/2020 | Huang | H04L 1/1812 |
| 2020/0412508 A1* | 12/2020 | Wu | H04L 1/1854 |
| 2021/0075552 A1* | 3/2021 | Huang | H04L 1/1854 |
| 2021/0105728 A1* | 4/2021 | Nguyen | H04W 8/24 |
| 2021/0105744 A1* | 4/2021 | Balasubramanian | H04W 76/14 |
| 2021/0112574 A1* | 4/2021 | Hosseini | H04L 5/0055 |
| 2021/0136740 A1* | 5/2021 | Xue | H04W 72/20 |
| 2021/0152320 A1* | 5/2021 | Sundararajan | H04W 72/0473 |
| 2021/0194548 A1* | 6/2021 | Pezeshki | G06N 3/045 |
| 2021/0298107 A1* | 9/2021 | Sarkis | H04W 72/0446 |
| 2022/0158657 A1 | 5/2022 | Oveis Gharan et al. | |
| 2023/0033774 A1 | 2/2023 | Koike-Akino et al. | |
| 2023/0318757 A1* | 10/2023 | Lee | H04L 1/1896 370/329 |

* cited by examiner

*Primary Examiner* — Albert Decady
*Assistant Examiner* — Osman M Alshack
(74) *Attorney, Agent, or Firm* — Holland & Hart LLP

(57) ABSTRACT

Methods, systems, and devices for wireless communications are described herein. A user equipment (UE) may generate a set of feedback bits corresponding to sidelink messages received via one or more sidelink channels. The UE may transmit a first sidelink message via a first feedback resource of a physical sidelink feedback channel occasion. The first sidelink message may include a first subset of the feedback bits. The UE may transmit at least two additional sidelink feedback messages via respective feedback resources. The first additional sidelink feedback message may include the first subset of feedback bits and a second subset of feedback bits encoded using an erasure coding function.

30 Claims, 16 Drawing Sheets

CODED SIDELINK FEEDBACK FOR IMPROVED RELIABILITY

FIELD OF TECHNOLOGY

The following relates to wireless communications, including coded sidelink feedback for improved reliability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Devices of a wireless communications system may transmit feedback to support improved reliability and efficiency. For example, a UE receives a downlink communication from a network entity, and the UE may transmit feedback that indicates whether the UE was able to successfully decode the downlink communication. Additionally, devices of a wireless communications system may repeat transmissions to support improved transmission reliability and efficiency. For example, a network entity may repeat downlink shared channel transmissions to improve likelihood of successful decoding by the UE.

SUMMARY

The described techniques relate to improved methods, systems, devices, and apparatuses that support coded sidelink feedback for improved reliability. For example, the described techniques provide for a user equipment or network entity encoding sidelink feedback as an encoded transmission, which a receiving device may use to decode or identify erased or dropped feedback bits. In some cases, a user equipment (UE) may generate a set of feedback bits corresponding to sidelink messages received via one or more sidelink channels. The UE may transmit a first sidelink message via a first feedback resource of a physical sidelink feedback channel occasion. The first sidelink message may include a first subset of the feedback bits. The UE may transmit another sidelink feedback message that includes the first subset of feedback bits and a second subset of feedback bits encoded using an erasure coding function.

A method for wireless communications at a first user equipment (UE) is described. The method may include generating a set of feedback bits corresponding to sidelink messages received via one or more sidelink channels, transmitting a first sidelink feedback message via a first feedback resource of a physical sidelink feedback channel occasion, the first sidelink feedback message including a first subset of feedback bits of the set of feedback bits, and transmitting at least two additional sidelink feedback messages via respective feedback resources, a first additional sidelink feedback message including the first subset of feedback bits and a second subset of feedback bits of the set of feedback bits encoded using an erasure coding function.

An apparatus for wireless communications at a first UE is described. The apparatus may include a processor, and a memory coupled with the processor, with instructions stored in the memory. The instructions may be executable by the processor to cause the apparatus to generate a set of feedback bits corresponding to sidelink messages received via one or more sidelink channels, transmit a first sidelink feedback message via a first feedback resource of a physical sidelink feedback channel occasion, the first sidelink feedback message including a first subset of feedback bits of the set of feedback bits, and transmit at least two additional sidelink feedback messages via respective feedback resources, a first additional sidelink feedback message including the first subset of feedback bits and a second subset of feedback bits of the set of feedback bits encoded using an erasure coding function.

Another apparatus for wireless communications at a first UE is described. The apparatus may include means for generating a set of feedback bits corresponding to sidelink messages received via one or more sidelink channels, means for transmitting a first sidelink feedback message via a first feedback resource of a physical sidelink feedback channel occasion, the first sidelink feedback message including a first subset of feedback bits of the set of feedback bits, and means for transmitting at least two additional sidelink feedback messages via respective feedback resources, a first additional sidelink feedback message including the first subset of feedback bits and a second subset of feedback bits of the set of feedback bits encoded using an erasure coding function.

A non-transitory computer-readable medium storing code for wireless communications at a first UE is described. The code may include instructions executable by a processor to generate a set of feedback bits corresponding to sidelink messages received via one or more sidelink channels, transmit a first sidelink feedback message via a first feedback resource of a physical sidelink feedback channel occasion, the first sidelink feedback message including a first subset of feedback bits of the set of feedback bits, and transmit at least two additional sidelink feedback messages via respective feedback resources, a first additional sidelink feedback message including the first subset of feedback bits and a second subset of feedback bits of the set of feedback bits encoded using an erasure coding function.

In some examples of the method, apparatuses, and non-transitory computer-readable medium described herein, transmitting at least two additional sidelink message may include operations, features, means, or instructions for transmitting a second sidelink feedback message including the second subset of feedback bits and transmitting the first additional sidelink feedback message including the first subset of feedback bits and the second subset of feedback bits encoded using the erasure coding function.

Some examples of the method, apparatuses, and non-transitory computer-readable medium described herein may further include operations, features, means, or instructions for transmitting a third sidelink feedback message including the first subset of feedback bits and the second subset of feedback bits encoded using a second erasure coding function.

Some examples of the method, apparatuses, and non-transitory computer-readable medium described herein may further include operations, features, means, or instructions for receiving control signaling indicating a quantity of feedback bits to encode for inclusion in the first additional sidelink feedback message and encoding the first subset of feedback bits and the second subset of feedback bits using the erasure coding function based on the quantity of feedback bits.

In some examples of the method, apparatuses, and non-transitory computer-readable medium described herein, receiving the control signaling may include operations, features, means, or instructions for receiving, from a second UE, a sidelink control information message indicating the quantity of feedback bits to encode.

Some examples of the method, apparatuses, and non-transitory computer-readable medium described herein may further include operations, features, means, or instructions for determining a quantity of feedback bits to encode for inclusion in the first additional sidelink feedback message based on a resource pool and encoding the first subset of feedback bits and the second subset of feedback bits using the erasure coding function based on based on the quantity of feedback bits.

In some examples of the method, apparatuses, and non-transitory computer-readable medium described herein, transmitting the at least two additional sidelink feedback messages may include operations, features, means, or instructions for transmitting the first additional sidelink feedback message via a second feedback resource.

In some examples of the method, apparatuses, and non-transitory computer-readable medium described herein, the first feedback resource and the second feedback resource include adjacent orthogonal frequency multiplexed symbols of the physical sidelink feedback channel occasion.

In some examples of the method, apparatuses, and non-transitory computer-readable medium described herein, the first feedback resource includes a first resource block of the physical sidelink feedback channel occasion with a first cyclic shift and the second feedback resource includes the first resource block with a second cyclic shift.

In some examples of the method, apparatuses, and non-transitory computer-readable medium described herein, the first feedback resource includes a first resource block of the physical sidelink feedback channel occasion and the second feedback resource includes a second resource block of the physical sidelink feedback channel occasion.

In some examples of the method, apparatuses, and non-transitory computer-readable medium described herein, the first feedback resource includes a first set of bits of the physical sidelink feedback channel occasion and the second feedback resource includes a second set of bits that may be adjacent to and follow the first set of bits of the physical sidelink feedback channel occasion.

In some examples of the method, apparatuses, and non-transitory computer-readable medium described herein, transmitting the first additional sidelink feedback message via the second feedback resource may include operations, features, means, or instructions for transmitting the first additional sidelink feedback message in the second feedback resource of a second physical sidelink feedback channel occasion.

Some examples of the method, apparatuses, and non-transitory computer-readable medium described herein may further include operations, features, means, or instructions for receiving control signaling indicating a second feedback resource that may be used to transmit the first additional sidelink feedback message, where the second feedback resource may be different from the first feedback resource that may be used to transmit the first sidelink feedback message.

Some examples of the method, apparatuses, and non-transitory computer-readable medium described herein may further include operations, features, means, or instructions for receiving control signaling indicating a repetition factor for encoding the set of feedback bits, where the at least two additional sidelink feedback messages may be transmitted based on the repetition factor.

Some examples of the method, apparatuses, and non-transitory computer-readable medium described herein may further include operations, features, means, or instructions for receiving control signaling indicating the erasure coding function, where the first additional sidelink feedback message may be transmitted based on receiving the control signaling.

Some examples of the method, apparatuses, and non-transitory computer-readable medium described herein may further include operations, features, means, or instructions for receiving, from a second UE or from a network entity, control signaling including a request for encoded feedback, where the first additional sidelink feedback message may be transmitted based on receiving the request.

Some examples of the method, apparatuses, and non-transitory computer-readable medium described herein may further include operations, features, means, or instructions for transmitting, to a second wireless device, a request that the second wireless device transmit an encoded feedback transmission including the first subset of feedback bits and the second subset of feedback bits.

A method for wireless communications at a first user equipment is described. The method may include transmitting at least one sidelink message via one or more sidelink channels, receiving a first sidelink feedback message via a first feedback resource of a physical sidelink feedback channel occasion, the first sidelink feedback message including a first subset of feedback bits corresponding to the at least one sidelink message, and receiving at least two additional sidelink feedback messages via respective feedback resources, a first additional sidelink feedback message including the first subset of feedback bits and a second subset of feedback bits encoded using an erasure coding function.

An apparatus for wireless communications at a first user equipment is described. The apparatus may include a processor, and a memory coupled with the processor, with instructions stored in the memory. The instructions may be executable by the processor to cause the apparatus to transmit at least one sidelink message via one or more sidelink channels, receive a first sidelink feedback message via a first feedback resource of a physical sidelink feedback channel occasion, the first sidelink feedback message including a first subset of feedback bits corresponding to the at least one sidelink message, and receive at least two additional sidelink feedback messages via respective feedback resources, a first additional sidelink feedback message including the first subset of feedback bits and a second subset of feedback bits encoded using an erasure coding function.

Another apparatus for wireless communications at a first user equipment is described. The apparatus may include means for transmitting at least one sidelink message via one or more sidelink channels, means for receiving a first sidelink feedback message via a first feedback resource of a physical sidelink feedback channel occasion, the first sidelink feedback message including a first subset of feedback bits corresponding to the at least one sidelink message, and means for receiving at least two additional sidelink feedback messages via respective feedback resources, a first additional sidelink feedback message including the first subset of feedback bits and a second subset of feedback bits encoded using an erasure coding function.

A non-transitory computer-readable medium storing code for wireless communications at a first user equipment is described. The code may include instructions executable by a processor to transmit at least one sidelink message via one or more sidelink channels, receive a first sidelink feedback message via a first feedback resource of a physical sidelink feedback channel occasion, the first sidelink feedback message including a first subset of feedback bits corresponding to the at least one sidelink message, and receive at least two additional sidelink feedback messages via respective feedback resources, a first additional sidelink feedback message including the first subset of feedback bits and a second subset of feedback bits encoded using an erasure coding function.

In some examples of the method, apparatuses, and non-transitory computer-readable medium described herein, receiving at least two additional sidelink feedback messages may include operations, features, means, or instructions for receiving a second sidelink feedback message including the second subset of feedback bits and receiving the first additional sidelink feedback message including the first subset of feedback bits and the second subset of feedback bits encoded using the erasure coding function.

Some examples of the method, apparatuses, and non-transitory computer-readable medium described herein may further include operations, features, means, or instructions for receiving a third sidelink feedback message including the first subset of feedback bits and the second subset of feedback bits encoded using a second erasure coding function.

Some examples of the method, apparatuses, and non-transitory computer-readable medium described herein may further include operations, features, means, or instructions for transmitting or receiving control signaling indicating a quantity of feedback bits that are to be encoded in the first additional sidelink feedback message and decoding at least the first subset of feedback bits using the erasure coding function based on the quantity of feedback bits.

In some examples of the method, apparatuses, and non-transitory computer-readable medium described herein, transmitting or receiving the control signaling may include operations, features, means, or instructions for transmitting, to a first UE, a sidelink control information message indicating the quantity of feedback bits to encode.

Some examples of the method, apparatuses, and non-transitory computer-readable medium described herein may further include operations, features, means, or instructions for determining a quantity of feedback bits that are to be encoded in the first additional sidelink feedback message based on a resource pool and decoding at least the first subset of feedback bits using the erasure coding function based on the quantity of feedback bits.

In some examples of the method, apparatuses, and non-transitory computer-readable medium described herein, receiving the at least two additional sidelink feedback messages may include operations, features, means, or instructions for receiving the first additional sidelink feedback message via a second feedback resource.

In some examples of the method, apparatuses, and non-transitory computer-readable medium described herein, the first feedback resource and the second feedback resource include adjacent orthogonal frequency multiplexed symbols of the physical sidelink feedback channel occasion.

In some examples of the method, apparatuses, and non-transitory computer-readable medium described herein, the first feedback resource includes a first resource block of the physical sidelink feedback channel occasion with a first cyclic shift and the second feedback resource includes the first resource block with a second cyclic shift.

In some examples of the method, apparatuses, and non-transitory computer-readable medium described herein, the first feedback resource includes a first resource block of the physical sidelink feedback channel occasion and the second feedback resource includes a second resource block of the physical sidelink feedback channel occasion.

In some examples of the method, apparatuses, and non-transitory computer-readable medium described herein, the first feedback resource includes a first set of bits of the physical sidelink feedback channel occasion and the second feedback resource includes a second set of bits that may be adjacent to and follow the first set of bits of the physical sidelink feedback channel occasion.

In some examples of the method, apparatuses, and non-transitory computer-readable medium described herein, receiving the first additional sidelink feedback message via the second feedback resource may include operations, features, means, or instructions for receiving the first additional sidelink feedback message in the second feedback resource of a second physical sidelink feedback channel occasion.

Some examples of the method, apparatuses, and non-transitory computer-readable medium described herein may further include operations, features, means, or instructions for receiving control signaling indicating a second feedback resource that may be used to receive the first additional sidelink feedback message, where the second feedback resource may be different from a first feedback resource that may be used to receive the first sidelink feedback message.

Some examples of the method, apparatuses, and non-transitory computer-readable medium described herein may further include operations, features, means, or instructions for receiving control signaling indicating a repetition factor for feedback bit encoding, where the first additional sidelink feedback message may be received based on the repetition factor.

Some examples of the method, apparatuses, and non-transitory computer-readable medium described herein may further include operations, features, means, or instructions for receiving control signaling indicating the erasure coding function, where the first additional sidelink feedback message may be received based on receiving the control signaling.

Some examples of the method, apparatuses, and non-transitory computer-readable medium described herein may further include operations, features, means, or instructions for transmitting, to a second wireless device, control signaling including a request for encoded feedback, where the first additional sidelink feedback message may be received from the second wireless device based on transmitting the request, where the second wireless device may be a network entity or a second UE.

In some examples of the method, apparatuses, and non-transitory computer-readable medium described herein, the first sidelink feedback message may be received from a second UE and the first additional sidelink feedback message may be received from a third UE or a network entity.

A method for wireless communications at a wireless device is described. The method may include monitoring for a first sidelink feedback message including a first subset of feedback bits and a second sidelink feedback message including a second subset of feedback bits and transmitting an additional sidelink feedback message via a feedback resource, the additional sidelink feedback message including the first subset of feedback bits and the second subset of feedback bits encoded using an erasure coding function.

An apparatus for wireless communications at a wireless device is described. The apparatus may include a processor, and a memory coupled with the processor, with instructions stored in the memory. The instructions may be executable by the processor to cause the apparatus to monitor for a first sidelink feedback message including a first subset of feedback bits and a second sidelink feedback message including a second subset of feedback bits and transmit an additional sidelink feedback message via a feedback resource, the additional sidelink feedback message including the first subset of feedback bits and the second subset of feedback bits encoded using an erasure coding function.

Another apparatus for wireless communications at a wireless device is described. The apparatus may include means for monitoring for a first sidelink feedback message including a first subset of feedback bits and a second sidelink feedback message including a second subset of feedback bits and means for transmitting an additional sidelink feedback message via a feedback resource, the additional sidelink feedback message including the first subset of feedback bits and the second subset of feedback bits encoded using an erasure coding function.

A non-transitory computer-readable medium storing code for wireless communications at a wireless device is described. The code may include instructions executable by a processor to monitor for a first sidelink feedback message including a first subset of feedback bits and a second sidelink feedback message including a second subset of feedback bits and transmit an additional sidelink feedback message via a feedback resource, the additional sidelink feedback message including the first subset of feedback bits and the second subset of feedback bits encoded using an erasure coding function.

Some examples of the method, apparatuses, and non-transitory computer-readable medium described herein may further include operations, features, means, or instructions for receiving, from a UE, a request for encoded feedback, where the additional sidelink feedback message may be transmitted based on receiving the request.

Some examples of the method, apparatuses, and non-transitory computer-readable medium described herein may further include operations, features, means, or instructions for storing the first subset of feedback bits and the second subset of feedback bits for a time period, where the request may be received during the time period.

Some examples of the method, apparatuses, and non-transitory computer-readable medium described herein may further include operations, features, means, or instructions for transmitting control signaling indicating a quantity of feedback bits that are to be encoded for inclusion in the additional sidelink feedback message and encoding the first subset of feedback bits and the second subset of feedback bits using the erasure coding function based on the quantity of feedback bits.

Some examples of the method, apparatuses, and non-transitory computer-readable medium described herein may further include operations, features, means, or instructions for determining a quantity of feedback bits to encode for inclusion in the additional sidelink feedback message based on a resource pool and encoding the first subset of feedback bits and the second subset of feedback bits using the erasure coding function based on the quantity of feedback bits.

Some examples of the method, apparatuses, and non-transitory computer-readable medium described herein may further include operations, features, means, or instructions for receiving control signaling indicating the erasure coding function, where the additional sidelink feedback message may be transmitted based on receiving the control signaling.

Some examples of the method, apparatuses, and non-transitory computer-readable medium described herein may further include operations, features, means, or instructions for transmitting, to one or more user equipments (UEs) control signaling indicating the erasure coding function.

Some examples of the method, apparatuses, and non-transitory computer-readable medium described herein may further include operations, features, means, or instructions for receiving control signaling indicating a repetition factor for encoding feedback bits, where the additional sidelink feedback message may be transmitted based on the repetition factor.

Some examples of the method, apparatuses, and non-transitory computer-readable medium described herein may further include operations, features, means, or instructions for transmitting or receiving control signaling indicating a feedback resource that the wireless device may be to use for transmitting the additional sidelink feedback message.

Some examples of the method, apparatuses, and non-transitory computer-readable medium described herein may further include operations, features, means, or instructions for transmitting control signaling indicating a capability of to transmit encoded feedback.

In some examples of the method, apparatuses, and non-transitory computer-readable medium described herein, the capability indicates a maximum quantity of feedback bits that the wireless device may be able to store in support of transmitting the encoded feedback.

In some examples of the method, apparatuses, and non-transitory computer-readable medium described herein, the wireless device may be another UE or a network entity.

DETAILED DESCRIPTION

Figure 1:
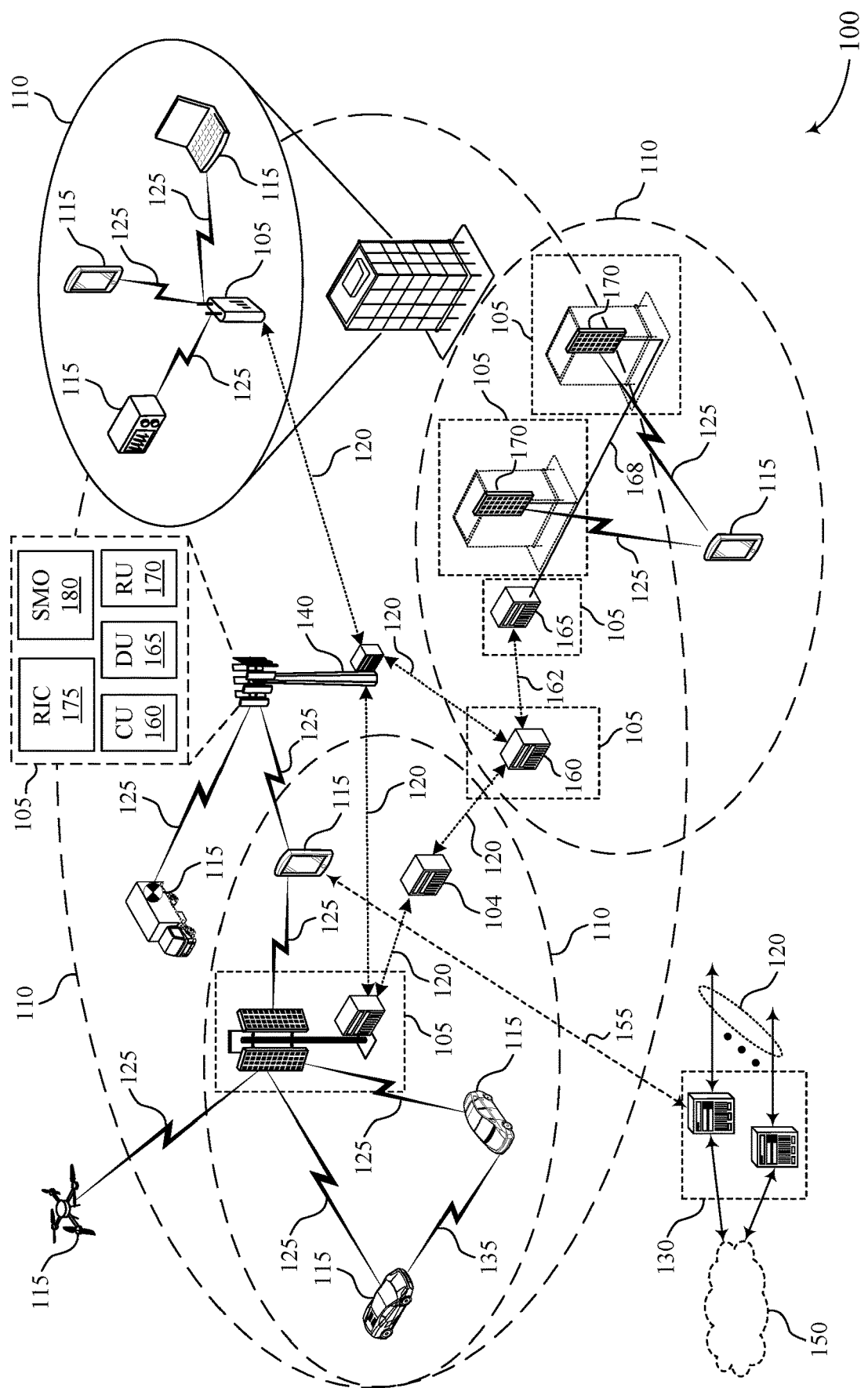
FIG. 1 illustrates an example of a wireless communications system that supports coded sidelink feedback for improved reliability in accordance with one or more aspects of the present disclosure.

Devices of a wireless communications system may transmit hybrid automatic repeat request (HARQ) feedback to improve communication reliability and efficiency. Additionally, user equipments (UEs) of a wireless communications system may communicate directly with one another using sidelink communications. In some examples, HARQ feedback may be used to support improved communication reliability and efficiency in sidelink communications between UEs. HARQ feedback for sidelink may be transmitted via resources of a physical sidelink feedback channel (PSFCH), and these resources may be allocated in a periodic manner, such as every four transmission time intervals (TTIs) (e.g., every four slots). In some examples, a sidelink feedback transmission on a PSFCH resource may include one or two bits. More particularly, each sidelink feedback transmission may include 1 bit for acknowledgment (ACK) or negative acknowledgment (NACK) for a sidelink communication, such that each PSFCH transmission corresponds to one transport block (TB). Other resources of the PSFCH may be used for automatic gain control (AGC).

In some examples, it may be beneficial for a PSFCH to convey multiple feedback bits and to design sidelink feedback to improve communication reliability while limiting sidelink retransmissions. As described herein, a PSFCH is able convey multiple bits, and sidelink UEs may use feedback repetitions with encoded feedback to support improved reliability and efficiency. For example, a first UE may receive one or more sidelink message from a second UE. The first UE may generate a set of feedback bits corresponding the one or more sidelink messages and transmit a first sidelink feedback message that comprises a first subset of the feedback bits, and the first sidelink feedback message may be transmitted via first feedback resource of a PSFCH occasion. The first UE may also transmit at least two additional sidelink feedback messages via respective feedback resources. One of the additional feedback messages may include the first subset of feedback bits and a second subset of the feedback bits that are encoded using an erasure coding function. The second UE that receives the feedback messages may use erasure decoding in conjunction with the multiple feedback messages to recover any missed or dropped feedback bits.

Additionally, a third device, such as a third UE or a network entity, may support improved sidelink feedback reliability and efficiency by performing network coding for multiple feedback messages. That is, the third device may monitor for feedback messages by multiple other UE, encode the feedback using an erasure coding function, and retransmit the feedback that is encoded using the erasure coding function. As such, a UE may receive one of the initial sidelink feedback transmissions by one of the other UEs, and the network encoded transmission by the third device, and use erasure decoding techniques to identify or recover any missed or dropped feedback messages. These and other techniques are described herein in further detail with respect to the figures.

Aspects of the disclosure are initially described herein in the context of wireless communications systems. Aspects of the disclosure are further described herein with respect to wireless communications systems illustrating sidelink communications, transmission diagrams, and process flow diagrams. Aspects of the disclosure are further illustrated by and described herein with reference to apparatus diagrams, system diagrams, and flowcharts that relate to coded sidelink feedback for improved reliability.

FIG. 1 illustrates an example of a wireless communications system 100 that supports coded sidelink feedback for improved reliability in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof Δ UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof Δn RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support coded sidelink feedback for improved reliability as described herein. For example, some operations described herein as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, UEs 115 of the wireless communications system may communicate directly with one another using sidelink communications. In some examples, UEs 115 may transmit HARQ feedback for sidelink messages using resources of a PSFCH. The PSFCH resources may support one or two bits for sidelink HARQ feedback, which may limit capacity and HARQ feedback reliability. Techniques described herein support utilization of multiple bits of a PSFCH transmission to transmit HARQ feedback via a coded transmission. A receiving device (e.g., a UE 115) may receive multiple HARQ feedback transmissions and use erasure decoding techniques to identify an erased or dropped feedback transmission, which may result in improved HARQ design. Additionally, techniques described herein may leverage network encoding to support improved HARQ feedback design. For examples, a network device (e.g., another UE 115 or a network entity 105) may monitor sidelink feedback transmissions by other UEs, and retransmit feedback in an encoded manner, which may result in reduced retransmissions by UEs and improved feedback reliability.

Figure 2:
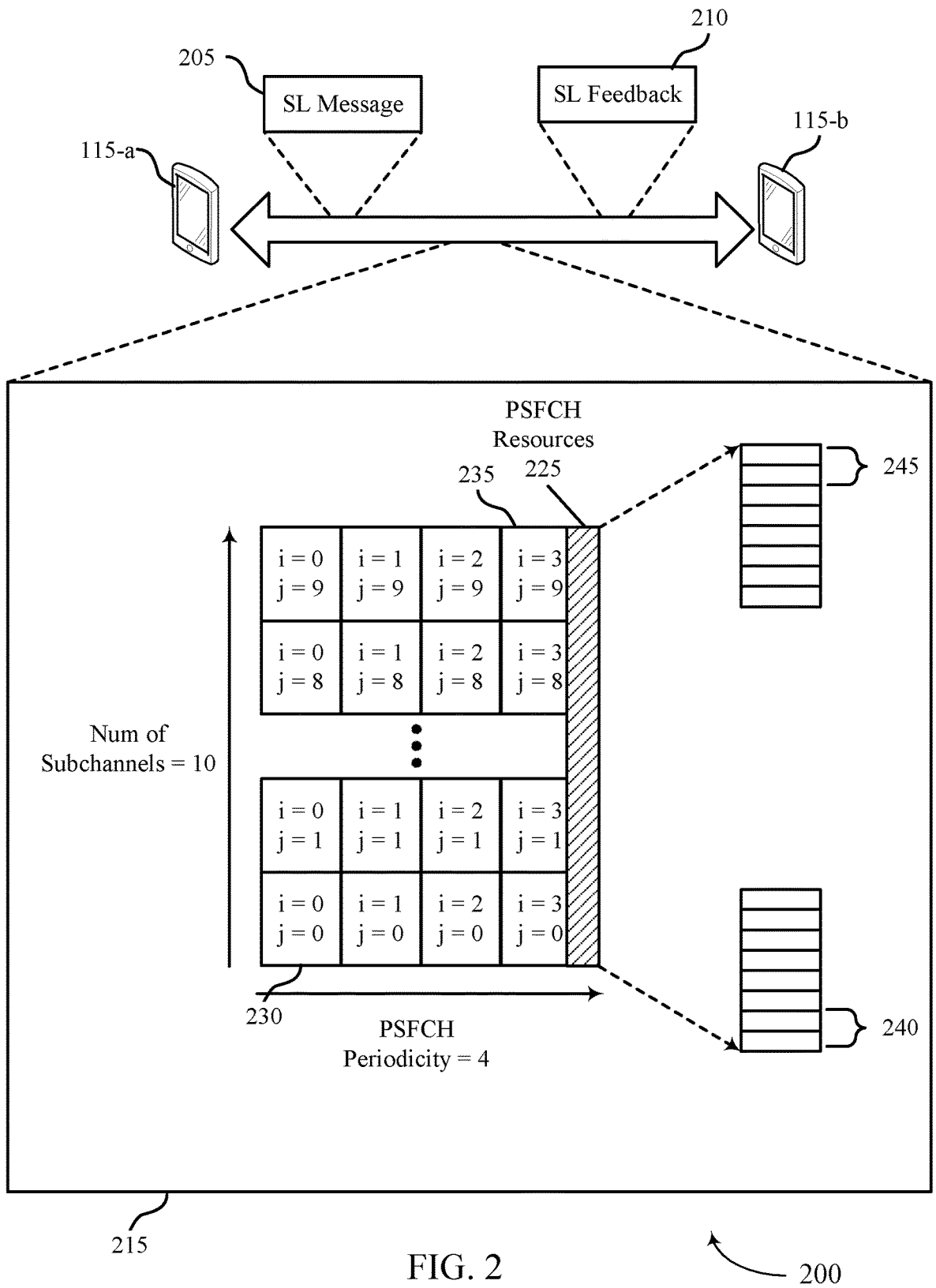
FIG. 2 illustrates an example of a wireless communications system that supports coded sidelink feedback for improved reliability in accordance with one or more aspects of the present disclosure.

FIG. 2 illustrates an example of a wireless communications system 200 that supports coded sidelink feedback for improved reliability in accordance with one or more aspects of the present disclosure. The wireless communications system 200 includes a UE 115-*a* and a UE 115-*b*, which may be examples of the UEs 115 as described herein with respect to FIG. 1. Specifically, FIG. 1 illustrates examples of sidelink communications between the UE 115-*a* and the UE 115-*b*.

As described herein, UEs 115-*a* and 115-*b* may communicate with one another via sidelink communications. For example, the UE 115-*a* may transmit a sidelink message 205 using resources of a physical sidelink shared channel (PSSCH) and/or resources of a physical sidelink control channel (PSCCH), which may be configured in one or more transmission time intervals (e.g., one or more slots). In some cases, each TTI of a set of TTIs may include PSSCH resources and PSCCH resources. Additionally, the UEs 115-*a* and 115-*b* may implement HARQ-ACK feedback transmissions for sidelink communications. For example, in response to receiving the sidelink message 205, the UE 115-*b* may transmit a sidelink feedback message 210 that indicates whether the UE 115-*b* was able to successfully decode the sidelink message 205. That is, the UE 115-*b* may transmit an acknowledgment (ACK) or a negative acknowledgment (NACK) as sidelink feedback message 210 in response to receiving the sidelink message 205. The sidelink feedback message 210 may be transmitted using resources of a PSFCH occasion (e.g., a slot with PSFCH resources). In some examples, the PSFCH resources may be configured to occur periodically, such as every four TTIs (e.g., every four slots).

In some examples, one PSFCH transmission may include one bit for ACK or NACK. More particularly, each PSFCH transmission corresponds to one transport block (TB). However, it may be beneficial for the PSFCH transmission to convey multiple bits (e.g., multiple feedback bits). For example, in carrier aggregation (CA) scenarios, the UE 115 may transmit a HARQ-ACK codebook that includes multiple HARQ-ACK bits corresponding to multiple TBs in the same PSFCH transmission. When code block groups (CBGs) are supported, one TB may contain multiple CBGs, and the UE 115 may convey one bit for each CBG. In another example, the UE may carry additional control information with the HARQ-ACK bit, such as channel state information (CSI), scheduling requests (SR), or other types of information. In examples when a UE 115 wants to convey multiple bits for a PSFCH transmission, the PSFCH resource that contains only two symbols (with one symbol for AGC) may not be sufficient in terms of link budget.

A sidelink resource pool that may be used by the UEs 115-*a* and the UE 115-*b* may configured with PSFCH resources, and sidelink HARQ is sequence based, such that PSFCH resources may carry a single bit per PSSCH. These symbols may be sent on two consecutive symbols, such as symbols 11 and 12 of the PSFCH slot. One symbol before and one symbol after the PSFCH occasion may be used as a gap. The symbol 11 may be used for AGC purposes, and, as such, the receiver may decode the feedback bit using only one symbol. UEs 115 may be configured with (e.g., using control signaling from a network entity 105 of FIG. 1) a parameter periodPSFCHresource that indicates the PFSCH periodicity, in quantity of slots, in a resource pool. This parameter may be set to {0,1,2,4}. If the parameter is set to 0, PSFCH transmissions from a UE in the resource pool are disabled. The UE may transmit the PSFCH in a first slot that includes PSFCH resources and is at least a quantity of slots, provided by a parameter MinTimeGapPSFCH, after a last slot of the PSSCH reception. The UE 115 may also be configured with the parameters: rbSetPSFCH, numSubchannel, $N_{PSSCH}^{PSFCH}$, $M_{PRB,set}^{PSFCH}$, and $M_{subch,slot}^{PSFCH}$. The parameter rbSetPSFCH may indicate a set of $M_{PPRB,set}^{PSFCH}$ PRBs in a resource pool for PSFCH transmission. The parameter numSubchannel may indicate a quantity of $N_{subch}$ sub-channels for the resource pool. The parameter $N_{PSSCH}^{PSFCH}$ corresponds to a quantity of PSSCH associated with a PSFCH slot, which is determined by periodPSFCHresource.

$$M_{PRB,set}^{PSFCH} = \alpha \cdot N_{subch} \cdot N_{PSSCH}^{PSFCH}, \text{ and } M_{subch,slot}^{PSFCH} = \frac{M_{PRB,set}^{PSFCH}}{N_{subch} \cdot N_{PSSCH}^{PSFCH}}.$$

Using these parameters and equations, the UE 115 may determine resources of the PSFCH for transmission of the HARQ-ACK. For example, the UE may assign indexes to transmission resources and determine corresponding PSFCH resources based on the assigned indexes, as illustrated in resource diagram 215. For example, the UE 115 allocates $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ physical resource blocks (PRBs) from $M_{PRB,set}^{PSFCH}$ PRBs to slot i and sub-channel j where $0 \le i \le N_{PSSCH}^{PSFCH}$ and $0 \le j \le N_{subch}$. In the example of resource diagram 215, $N_{PSSCH}^{PSFCH}=4$ is the PSFCH periodicity, $N_{subch}=10$ is the quantity of subchannels for the resource pool, and $M_{subch,slot}^{PSFCH}=80/(4*10)=2$ such that there are 80 PRBs for PSFCH resources 225. Thus, each sub-channel is associated with 2 PSFCH PRBs, but the PSFCH feedback is send using one of the PRBs. The UE may select one of the two resources based on the source and destination identifier (e.g., i=(source identifier+destination identifier) mod 2). In the example of resource diagram 215, the resources of subchannel j=0 of slot 230 (e.g., slot i=0) are mapped to PRBs 240 of PSFCH resources 225. Resources of subchannel j=9 of slot 235 (e.g., i=9) are mapped to PRBs 245 of PSFCH resources 225.

As described herein, a PSFCH design is proposed to improve reliability with the lowest quantity of retransmissions. More particularly, techniques described herein support a retransmission of a combined/linear coded version of one or more feedback occasions. For example, the UE 115-*b* may receive multiple sidelink messages (e.g., sidelink message 205) from the UE 115-*a*. The UE 115-*b* may generate a set of feedback bits corresponding to the sidelink messages received from the UE 115-*a*. The UE 115-*b* may transmit a first sidelink feedback message corresponding to a first sidelink message, a second sidelink feedback message corresponding to a second sidelink message, and a third sidelink message that includes bits of the first sidelink feedback message and the second sidelink feedback message that are encoded using an erasure coding function. The UE 115-*a* may receive the sidelink feedback messages, and use the erasure coding function decode the feedback messages. The use of the erasure coding function may support decoding of feedback, even if at least one of the feedback bits is lost or dropped in the feedback transmission. As such, the techniques described herein may support improved feedback transmission reliability and efficiency.

Figure 3:
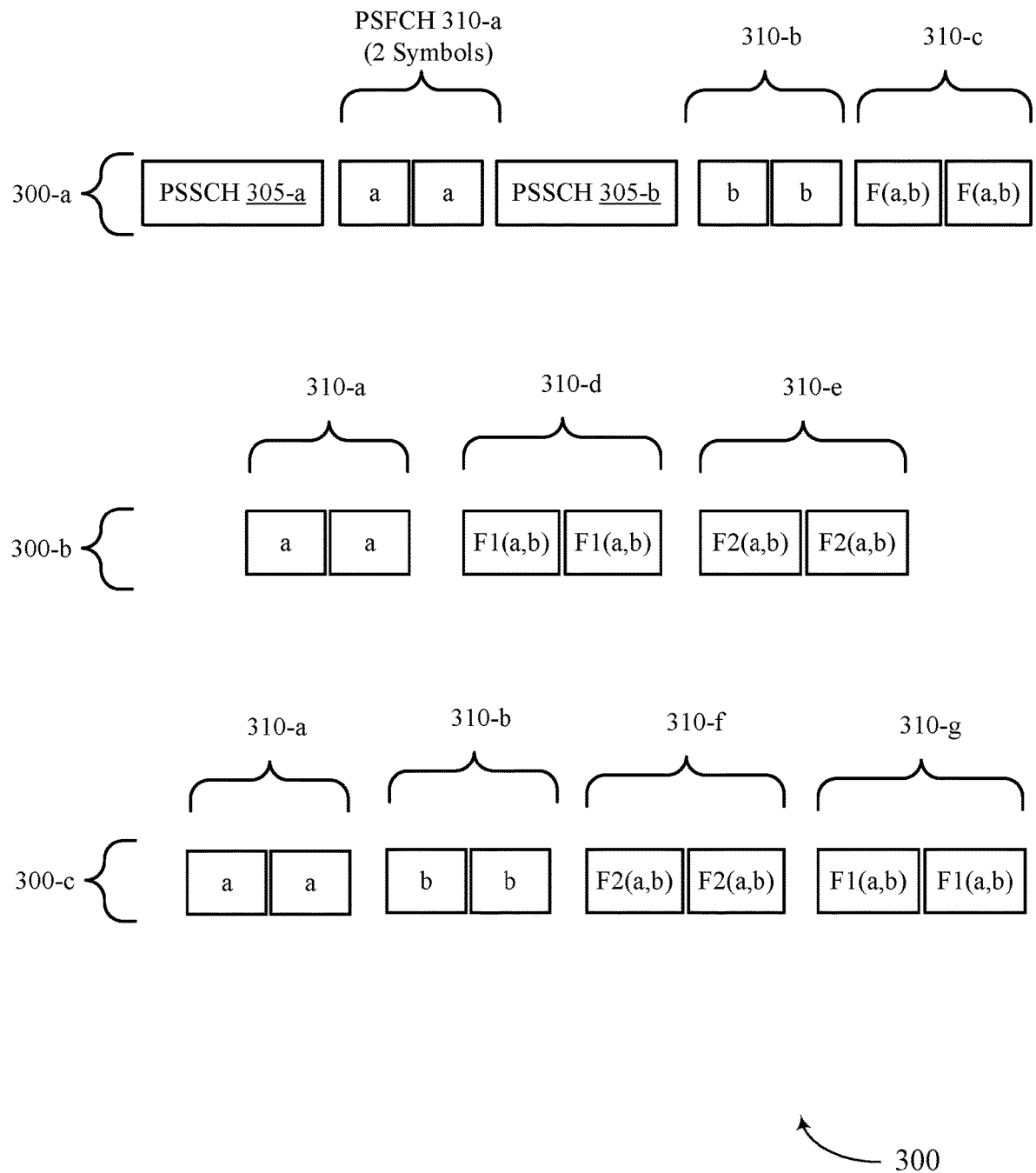
FIG. 3 illustrates examples of transmission diagrams that support coded sidelink feedback for improved reliability in accordance with one or more aspects of the present disclosure.

FIG. 3 illustrates examples of transmission diagrams 300 that support coded sidelink feedback for improved reliability in accordance with one or more aspects of the present disclosure. The transmission diagrams 300 may implemented by UEs 115, as described herein with respect to FIG. 1 and FIG. 2. For example, the UEs 115 may implement transmission diagrams 300 in support of sidelink feedback.

In the transmission diagrams 300, bits "a" of PSFCH message 310 a and bits "b" of PSFCH message 310-*b* are feedback bits (e.g., HARQ-ACK bits). For example, the bits "a" of PSFCH message 310-*a* may correspond to PSSCH message 305-*a* (e.g., a sidelink message) of resource diagram 300-*a*, and the bits "b" of PSFCH message 310-*b* may correspond to PSSCH message 305-*b* (e.g., a sidelink message) of resource diagram 300-*a*. Thus, after receiving PSSCH message 305-*a*, the UE may transmit the PSFCH message 310-*a* in a first PSFCH occasion or slot. After receiving the PSSCH message 305-*b*, the UE may transmit the PSFCH message 310-*b* in a second PSFCH occasion or slot. Additionally, as described herein, the UE may transmit the PSFCH message 310-*c*, which includes both bits "a" and "b" that are encoded using an erasure coding function (e.g., "F"), such that that the PSFCH message 310-*c* includes F(a, b). In some examples, the PSFCH message 310-*a* and the PSFCH message 310-*b* may be transmitted to different UEs (e.g., different UE's that transmitted the PSSCH messages 305). In such cases, the PSFCH message 310-*c* that includes the encoded bits may be transmitted to both of the transmitting UEs. The transmitting UEs (e.g., the UEs that transmit the PSSCH message 305 triggering the feedback transmissions) may receive one or more of the PSFCH messages 310-*a* or 310-*b*, and the PSFCH message 310-*c*, and decode the PSFCH messages 310. In cases, the transmitting UEs may decode the feedback bits using an erasure coding function.

Thus, after transmitting a set of PSFCH messages (e.g., PSFCH message 310-*a* and 310-*b*), the receiving UE may send an encoded version of the bits in an extra PSFCH occasion to improve reliability of the PSFCH. In some examples, these techniques leverage additional bits (e.g., more than one or two bits) that may be available in PSFCH resources. The quantity of coded repetition bits N (in addition to other feedback parameters) may be indicated to a receiving UE using control signaling. For example, N may be indicated to a receiving UE by a transmitting UE, such as by the sidelink control information that schedules the (last) PSSCH transmission. The control signaling may indicate that the receiving UE is to send a coded version of the last 1 or up to K, where K is RRC or MAC-CE (e.g., from a network entity 105) configured or SCI configured. In some examples, the quantity of bits may be indicated via a bitmap that maps to a previous PSFCH occasion (e.g., where a value of "1" indicates that the bit should be retransmitted in an encoded transmission). Additionally, or alternatively, the quantity of bits for the encoded feedback transmission may be configured at the resource pool level or across resource pools. That is, the quantity of encoded bits for a PSFCH transmission may be mapped to or configured for each sidelink resource pool.

The resources that are used to transmit the PSFCH message 310-*c* (e.g., the coded feedback message) may be contained in the same slot that contains one or more of the initial sidelink feedback messages, such as on back-to-back OFDM symbols. In such cases, the PSFCH resources may be allocated to more than two OFDM symbols. In some cases, the encoded bits are multiplexed with or after the last PSFCH bit of the PSFCH resource of the slot. If the encoded bits are multiplexed with the PSFCH bits, the encoded bits may be on the same RB (as the initial PSFCH bits) with a different cyclic shift or on a different RB. In some examples, the encoded bits are transmitted on a separate PSFCH resource occasion (e.g., in a subsequent PSFCH slot) before or after the initial feedback transmissions (e.g., the PSFCH messages 310-*a* and 310-*b*). To avoid collisions, the resources that are used to transmit the PSFCH with repetitions (encoded bits) may be configured in a separate resource set from the resource used to transmit PSFCH without repetition. That is, the PSFCH repetitions may be transmitted in different slots from the PSFCH without repetition, or on different RBs.

An erasure coding function that is used to encode feedback repetitions may include single erasure. In such cases, single parity check codes may be used to correct one erasure. For example, if an input is [a, b, c], is encoded as [a, b, c, a⊕b⊕c] (where ⊕ is "exclusive or" (XOR)), and is transmitted, any single erasure (e.g., dropped bit) may be recovered. For example, if the received vector is [a, ?, c, a⊕b⊕c], the erased element can be recovered by summing the others: a⊕c⊕(a⊕b⊕c)=b. This may be viewed as a linear system (e.g., over a Galois field), with three variables and four linearly independent constraints:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T$$

Any three constraints (one erasure) are sufficient to find the three variables.

As an extension of a single parity example, for two or more erasures, a Reed-Solomon (or other maximum distance separable code (MDS code)) may be used. In such cases, any k symbols of an n symbol codeword may be sufficient to decode the k information symbols. An example of a coding to recover up to two erasures is as follows:

$$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix} \cdot [a \ b \ c]^T = [a \ b \ c \ a+b+c \ a+\alpha \cdot b + \alpha^2 \cdot c]^T$$

As illustrated in transmission diagram 300-*b* and 300-*c*, different erasure functions (e.g., F1 vs. F2) may be used for transmission of the feedback bit repetitions. Thus, the PSFCH message 310-*d* and the PSFCH message 310-*e* of transmission diagram 300-*b* may be transmitted on a same slot (e.g., in the same PSFCH occasion) or in different slots, such that the PSFCH message 310-*e* is transmitted on a future occasion relative to the PSFCH message 310-*d*. In the example of transmission diagram 300-*b*, the receiver of the PSFCH message 310-*d* or PSFCH message 310-*e*, if different from the receiver of PSFCH message 310-*a*, may wait until a third transmission (which includes feedback that the receiver is to receive) to receive the bits. As such, there may be increased latency if the individual feedback (e.g., initial feedback) is not received.

The transmission diagram 300-*c* may be implemented by multiple UEs to support improved reliability of encoded feedback. where PSFCH message 310-*a* includes individual feedback, PSFCH message 310-*b* includes individual feedback, PSFCH message 310-*f* includes encoded feedback that encodes "a" and "b" from both initial transmissions, and PSFCH message 310-*g* includes encoded feedback that encodes "a" and "b" from both initial transmissions. The erasure coding function for PSFCH message 310-*g* is different from erasure coding function for PSFCH message 310-*f*.

In some examples, the pattern of erasure coding functions and/or the quantity of bits k (n-m where M is the maximum erasure that can be fixed by the code) out of n coded symbols that are used to transmit the PSFCH feedback may be configured at the receiving UE, such as by the transmitting UEs using layer 1 (L1), layer 2 (L2), and/or layer 3 (L3) control signaling.

As described herein, the receiver devices for transmission diagrams 300 may receive feedback that is intended for other devices. For example, a first UE 115 may be monitoring for feedback "a" corresponding to a sidelink message transmitted by the first UE 115. The first UE 115 may also receive feedback "b" that corresponds to a sidelink transmission by a second UE 115. The first UE 115 may use the feedback "b" in conjunction with an encoded feedback transmission (e.g., F(a, b)) to decode the bit for "a" in cases where "a" is dropped. This technique is enabled by the use of a resource pool that is shared by multiple sidelink UEs 115. That is, multiple UEs 115 may monitor for/receive sidelink transmissions that are intended for other UEs 115 via the shared resource pool.

Figure 4:
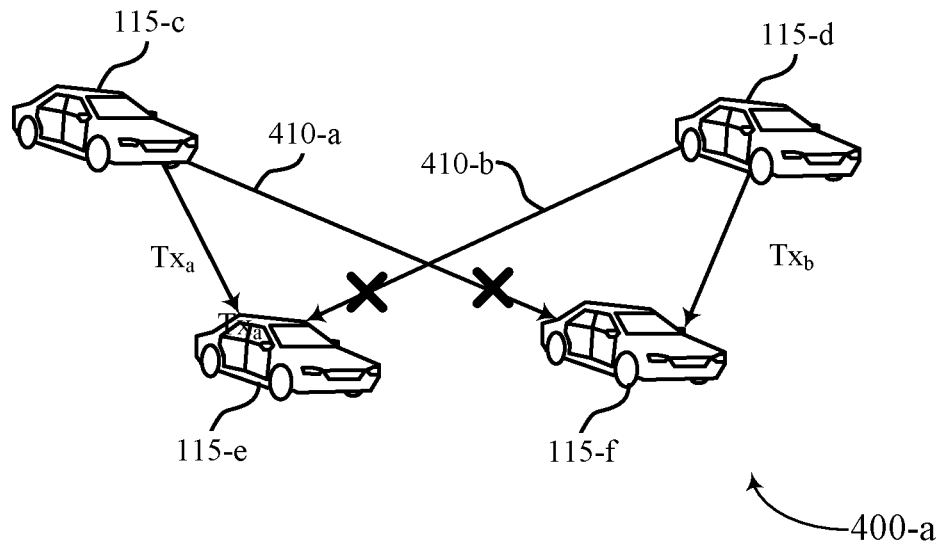
FIG. 4 illustrates examples of wireless communications systems that support coded sidelink feedback for improved reliability in accordance with one or more aspects of the present disclosure.
Figure 4:
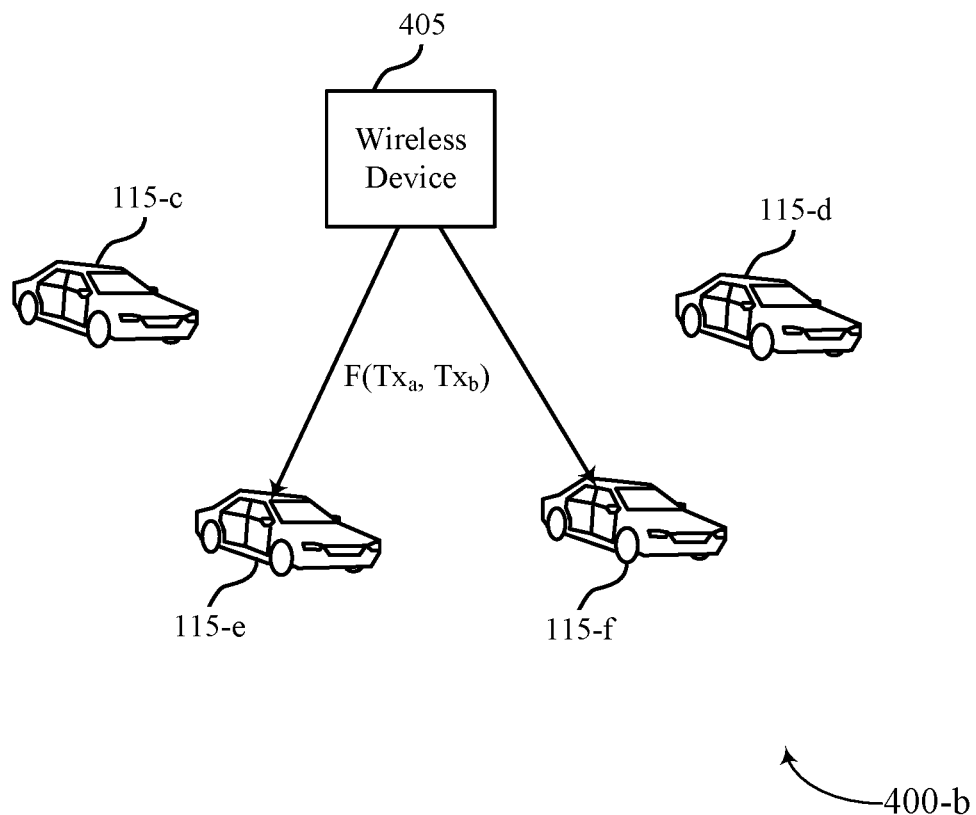

FIG. 4 illustrates examples of wireless communications systems 400 that support coded sidelink feedback for improved reliability in accordance with one or more aspects of the present disclosure. The wireless communications systems 400-*a* and 400-*b* include UEs 115, which may be examples of the UEs 115 as described herein with respect to FIGS. 1 and 2.

In some wireless communications systems, such as wireless communications systems 400, network coding may be used to increase system capacity and improve resource utilization. Network coding may be achieved by reducing the quantity of retransmissions in the system while maintaining performance. Additionally, network coding may support the increase in the quantity of UEs in an environment or the amount of traffic per UE. After an initial transmission, retransmissions may be replaced by a network coded transmission.

As illustrated in wireless communications system 400-*a*, the UE 115-*c* may transmit one or more initial transmission to UE 115-*e* and UE 115-*f*, and the UE 115-*d* may transmit one or more initial transmissions to UE 115-*e* and 115-*f*. As illustrated in wireless communications system 400-*a*, two of the initial transmissions (e.g., transmission 410-*a* and 410-*b*) may fail. Instead of the transmitting UEs 115-*c* and 115-d retransmitting the initial transmission, a network coding technique may be implemented to cause retransmission of both transmissions, in an encoded manner, such that the receiving devices may decode the dropped or missed transmissions.

As illustrated in wireless communications system 400-*b*, a wireless device 405, which may be an example of another UE 115, a network entity 105, or a road side unit (RSU), a relay device, or the like, may receive the initial transmissions (e.g., $T_{Xa}$ and $T_{Xb}$) and retransmit the initial transmissions as an encoded transmission (e.g., F($T_{Xa}$, $T_{Xb}$)) to both UEs 115-*e* and 115-*f*. As such, rather than both UE 115-*c* and UE 115-*d* retransmitting the initial transmission, the wireless device 405 may transmit an encoded version of both initial transmissions, which may result in improved resource utilization (e.g., in the shared sidelink resource pool).

To support network encoding for sidelink communications, a UE (e.g., UE 115-*c*) may transmit a transport block with a network coding request flag. The network coding device (e.g., wireless device 405) may accept the request and transmit the network coded transmission. In some examples, the acceptance is in the form of transmission of the transport block that is part of the network coded transmission.

The network coding techniques may be used in conjunction with the PSFCH coded transmission techniques described herein to further support improved sidelink feedback reliability and efficiency. For example, as illustrated in wireless communications system 400-*b*, the wireless device 405 may function as a helper UE or a network entity to observe, collect, and decode PSFCH from one or more UEs 115, such as UE 115-*c* and UE 115-*d*. The wireless device 405 may monitor for a first sidelink feedback message and a second sidelink feedback message from one or both of the UE 115-*c* and the UE 115-*d* (e.g., the wireless device 405 may monitor PSFCH occasions). The first sidelink feedback message may include a first subset of feedback bits, and the second sidelink feedback message may include a second subset of feedback bits. The wireless device 405 may encode the feedback bits into encoded feedback message (e.g., F($T_{Xa}$, $T_{Xb}$)) and transmit the encoded feedback message to both UE 115-*e* and 115-*f*, so that the original sidelink feedback messages and the encoded sidelink feedback messages may be used to recover any dropped or erased bits from the initial sidelink feedback messages.

The wireless device 405 may utilize the encoding techniques described herein, such as single erasure coding or other MDS codes. Additionally, the network encoded sidelink feedback transmission may be transmitted using resources of a PSFCH occasion (e.g., a PSFCH slot). In some examples, the resources that are used for communication of the network encoded sidelink feedback may be configured at the wireless device 405 (e.g., using control signaling), at the UEs 115, or both the wireless device 405 and the UEs 115. In some examples, the wireless device 405 may indicate to the UEs 115 the resources that are to be used for a network encoded sidelink feedback message, the coding technique, the quantity of bits to encode, etc. Additionally alternatively, one of the feedback transmitting UEs may request the network encoding via a SCI or via a flag with an initial PSFCH transmission. Accordingly, using the sidelink feedback encoding techniques described herein may support improved sidelink feedback communication between UEs 115.

Figure 5A:
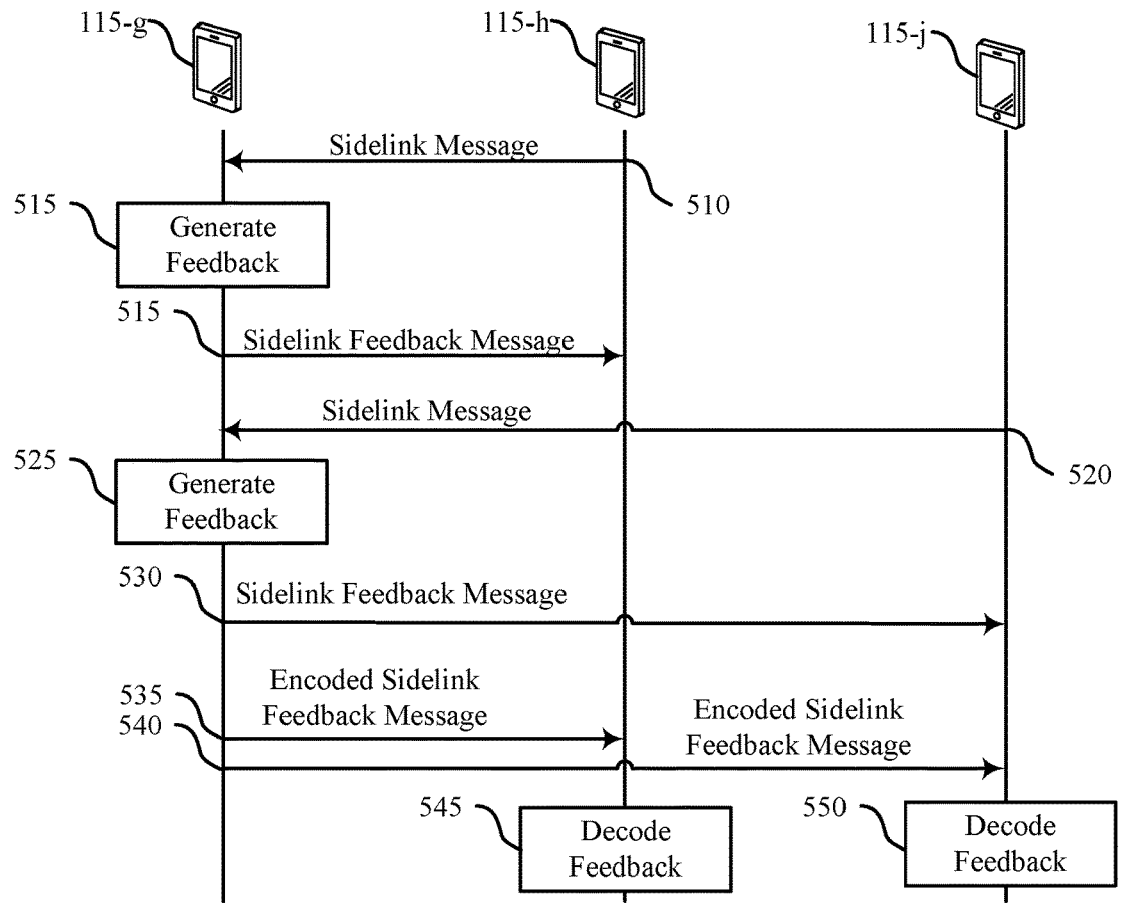
FIG. 5A and FIG. 5B illustrate examples of process flows that support coded sidelink feedback for improved reliability in accordance with one or more aspects of the present disclosure.
Figure 5B:
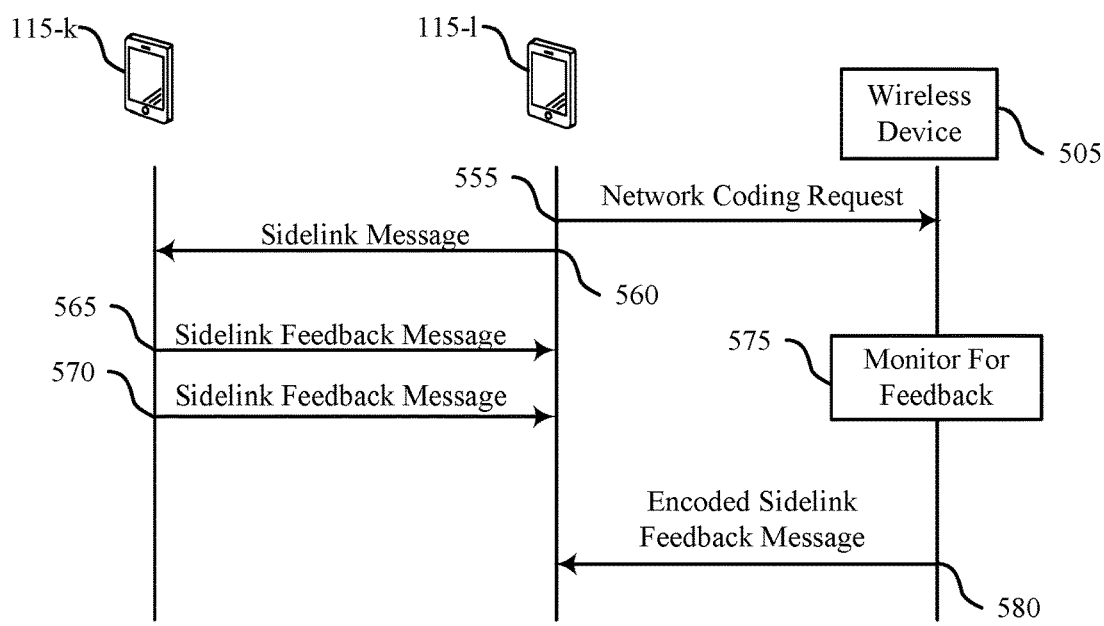

FIG. 5A and FIG. 5B illustrate examples of a process flows 500 that support coded sidelink feedback for improved reliability in accordance with one or more aspects of the present disclosure. In the following description of the process flows 500, the operations between the devices of the process flows 500 may be transmitted in a different order than the example order shown, or the operations performed may be performed in different orders or at different times. Some operations may also be omitted from the process flows 500, and other operations may be added to the process flow 500. The process flow 500-*a* includes a UE-g, a UE 115-*h*, and a UE 115-*j*, which may be examples of the UEs 115 as described herein with respect to FIGS. 1 through 4.

One or more of the UEs 115-*g*, 115-*h*, and 115-*j* may receive control signaling (from other UEs 115 or from network entity 105) that indicates a configuration for encoding sidelink feedback messages. The control signaling may indicate a quantity of bits that may be encoded, a resource to use for transmitting the encoded transmissions, an erasure coding function, a repetition factor (e.g., use of a first function and a second function or multiple instances of the same function), or any combination thereof. The control signaling may be an example of any type of L1, L2, or L3 signaling, or any combination thereof. In some examples, some aspects are configured by a network entity, while other aspects are configured or indicated by another UE 115.

At 510, the UE 115-*g* may receive, from the UE 115-*h*, a sidelink message on a resource of a sidelink channel (e.g., PSSCH resources of a sidelink resource pool). At 515, the UE 115-*g* may generate a first subset of feedback bits, where the first subset corresponds to the sidelink message received at 510. At 515, the UE 115-*g* may transmit, to the UE 115-*h*, a first sidelink feedback message via a first feedback resource of a PSFCH occasion (e.g., a slot that includes PSFCH resources). The first sidelink feedback message may include the first subset of feedback bits. At 520, the UE 115-*g*, may receive, from the UE 115-*j*, a second sidelink message on a resource of a sidelink channel (e.g., PSSCH resources of a sidelink resource pool). In some cases, the second sidelink message may also be received from the UE 115-*h*. At 525, the UE 115-*g* may generate a second subset of feedback bits corresponding to the second sidelink message. As such, the UE 115-*g* may generate a set of feedback bits corresponding to sidelink messages received via one or more sidelink channels, and the set of sidelink feedback bits may include the first subset and the second subset. At 530, the UE 115-*g* may transmit, to the UE 115-*j* that transmitted the second sidelink message, an additional sidelink feedback message that includes the second subset of feedback bits.

At 535 and 540, the UE 115-*g* may transmit an encoded sidelink feedback message (e.g., an additional sidelink feedback message) that includes the first subset of feedback bits and the second subset of feedback bits that are encoded using an erasure coding function. The encoded sidelink feedback message may be transmitted via a OFDM symbol that is adjacent to (and follows) the OFDM symbol that carries the first sidelink feedback message or the second sidelink feedback message. In some examples, the first or the second sidelink feedback message is transmitted via a first RB with a first cyclic shift, and the encoded sidelink feedback message is transmitted via the first RB with a second cyclic shift. In some examples, the first or the second sidelink feedback message is transmitted via a first RB of an PSFCH occasion, and the encoded sidelink feedback message is transmitted via a second RB of the PSFCH occasion. In some examples, the encoded sidelink feedback message is transmitted via a set of bits that follow a first set of bits carrying the first or second sidelink feedback message. In some examples, the encoded sidelink feedback message is transmitted on a separate PSFCH occasion from the PSFCH occasion carrying the first or the second sidelink feedback message.

At 545 and at 550, the UE 115-*h* and the UE 115-*j* may decode the sidelink feedback messages using the initial sidelink feedback messages and the encoded sidelink feedback message. For example, the UE 115-*h* and the UE 115-*j* may apply the erasure coding function to the bits of the initial sidelink feedback messages and the encoded sidelink feedback message to identify any erased or dropped bits.

The process flow 500-*b* of FIG. 5B includes a UE 115-*k*, a UE 115-*k*, and a wireless device 505. The UE 115-*k* and the UE 115-*l* may be examples of the UEs 115 as described herein with respect to FIGS. 1 through 4. The wireless device 505 may be an example of the wireless device 405 of FIG. 4.

Similar as described herein with respect to the process flow 500-*a*, the devices of the process flow 500-*b* may receive control signaling that indicates configurations for sidelink feedback encoding.

At 555, the UE 115-*l* may transmit a request for encoded feedback to the wireless device 505. In some examples, the request is transmitted to multiple devices (e.g., the UE 115-*k*). At 560, the UE 115-*l* may transmit, and the UE 115-*k* may receive a first sidelink message via one or more sidelink channels (e.g., a PSSCH of a sidelink resource pool). In some examples, the first sidelink feedback message may include the network coding request. At 565, the UE 115-*k* may transmit a first sidelink feedback message corresponding to the first sidelink message. The UE 115-*l* may receive the first sidelink message via a first resource of a PSFCH occasion (e.g., a PSFCH slot), and the first sidelink feedback message may include a first subset of feedback bits corresponding to the sidelink message. At 570, the UE 115-*l* may receive an additional sidelink feedback message that includes a second subset of feedback bits. In some cases, the additional sidelink feedback message is received from the UE 115-*k* and corresponds to another sidelink message transmitted to the UE 115-*k* by the UE 115-*l*. The additional sidelink feedback message may be received from another device based on the other device using the shared sidelink resource pool.

At 575, the wireless device 505 may monitor the sidelink resource pool for sidelink messages, such as the sidelink messages a 565 and 570. At 580, the wireless device 505 may transmit at least one encoded sidelink feedback message (e.g., an additional sidelink feedback message) that includes the first subset of bits and the second subset of bits encoded using an erasure coding function. The UE 115-*l* may decode the sidelink feedback using the initial sidelink feedback messages and the encoded sidelink feedback message.

Figure 6:
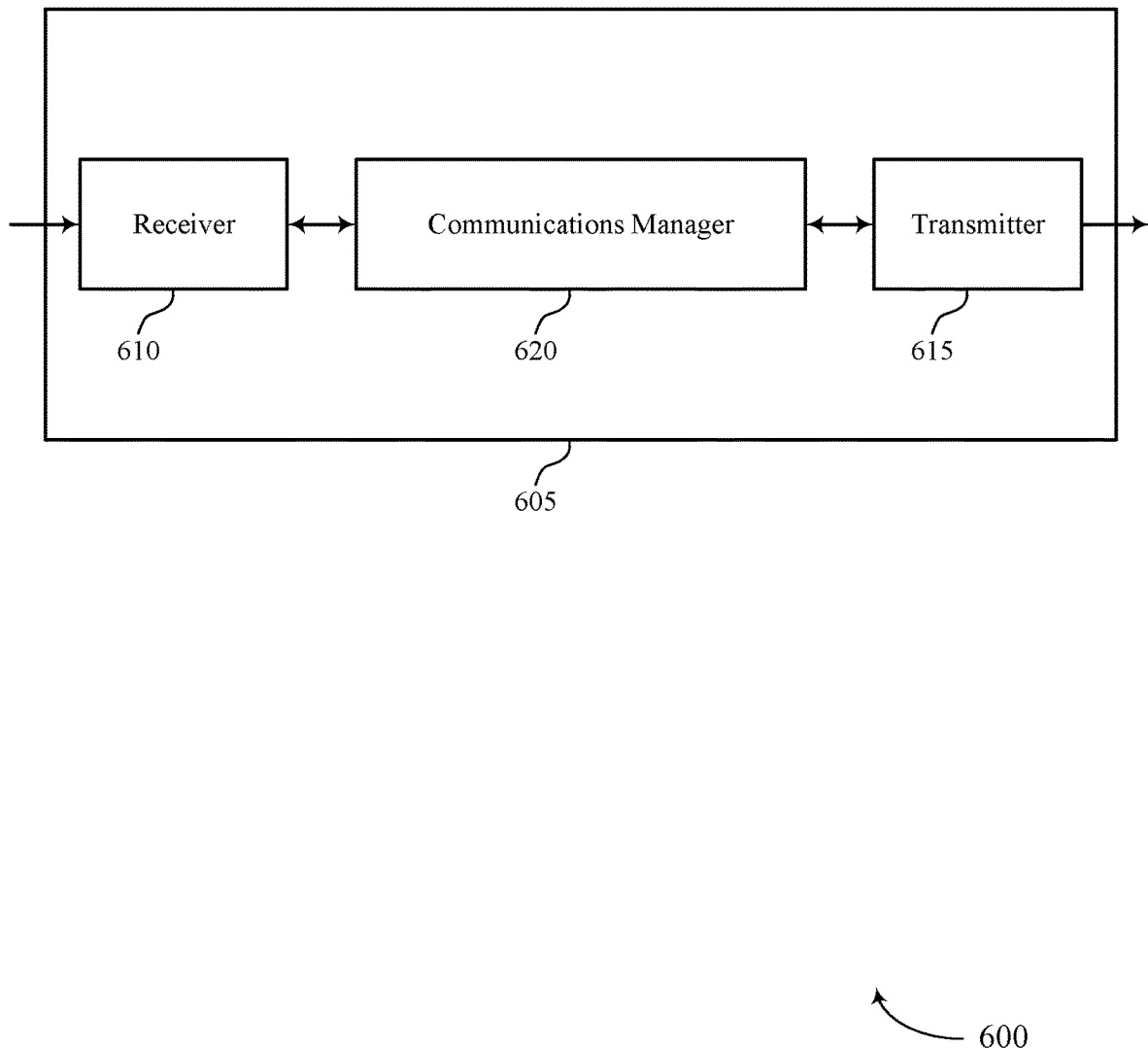
FIGS. 6 and 7 show block diagrams of devices that support coded sidelink feedback for improved reliability in accordance with one or more aspects of the present disclosure.

FIG. 6 shows a block diagram 600 of a device 605 that supports coded sidelink feedback for improved reliability in accordance with one or more aspects of the present disclosure. The device 605 may be an example of aspects of a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to coded sidelink feedback for improved reliability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coded sidelink feedback for improved reliability). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of coded sidelink feedback for improved reliability as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 may be configured as or otherwise support a means for generating a set of feedback bits corresponding to sidelink messages received via one or more sidelink channels. The communications manager 620 may be configured as or otherwise support a means for transmitting a first sidelink feedback message via a first feedback resource of a physical sidelink feedback channel occasion, the first sidelink feedback message including a first subset of feedback bits of the set of feedback bits. The communications manager 620 may be configured as or otherwise support a means for transmitting at least two additional sidelink feedback messages via respective feedback resources, a first additional sidelink feedback message including the first subset of feedback bits and a second subset of feedback bits of the set of feedback bits encoded using an erasure coding function.

Additionally, or alternatively, the communications manager 620 may support wireless communications at a first user equipment in accordance with examples as disclosed herein. For example, the communications manager 620 may be configured as or otherwise support a means for transmitting at least one sidelink message via one or more sidelink channels. The communications manager 620 may be configured as or otherwise support a means for receiving a first sidelink feedback message via a first feedback resource of a physical sidelink feedback channel occasion the first sidelink feedback message including a first subset of feedback bits corresponding to the at least one sidelink message. The communications manager 620 may be configured as or otherwise support a means for receiving at least two additional sidelink feedback messages via respective feedback resources, a first additional sidelink feedback message including the first subset of feedback bits and a second subset of feedback bits encoded using an erasure coding function.

Additionally, or alternatively, the communications manager 620 may support wireless communications at a wireless device in accordance with examples as disclosed herein. For example, the communications manager 620 may be configured as or otherwise support a means for monitoring for a first sidelink feedback message including a first subset of feedback bits and a second sidelink feedback message including a second subset of feedback bits. The communications manager 620 may be configured as or otherwise support a means for transmitting an additional sidelink feedback message via a feedback resource, the additional sidelink feedback message including the first subset of feedback bits and the second subset of feedback bits encoded using an erasure coding function.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing due to dropped or erased feedback, as encoding feedback may support increased likelihood of successful transmission of feedback.

Figure 7:
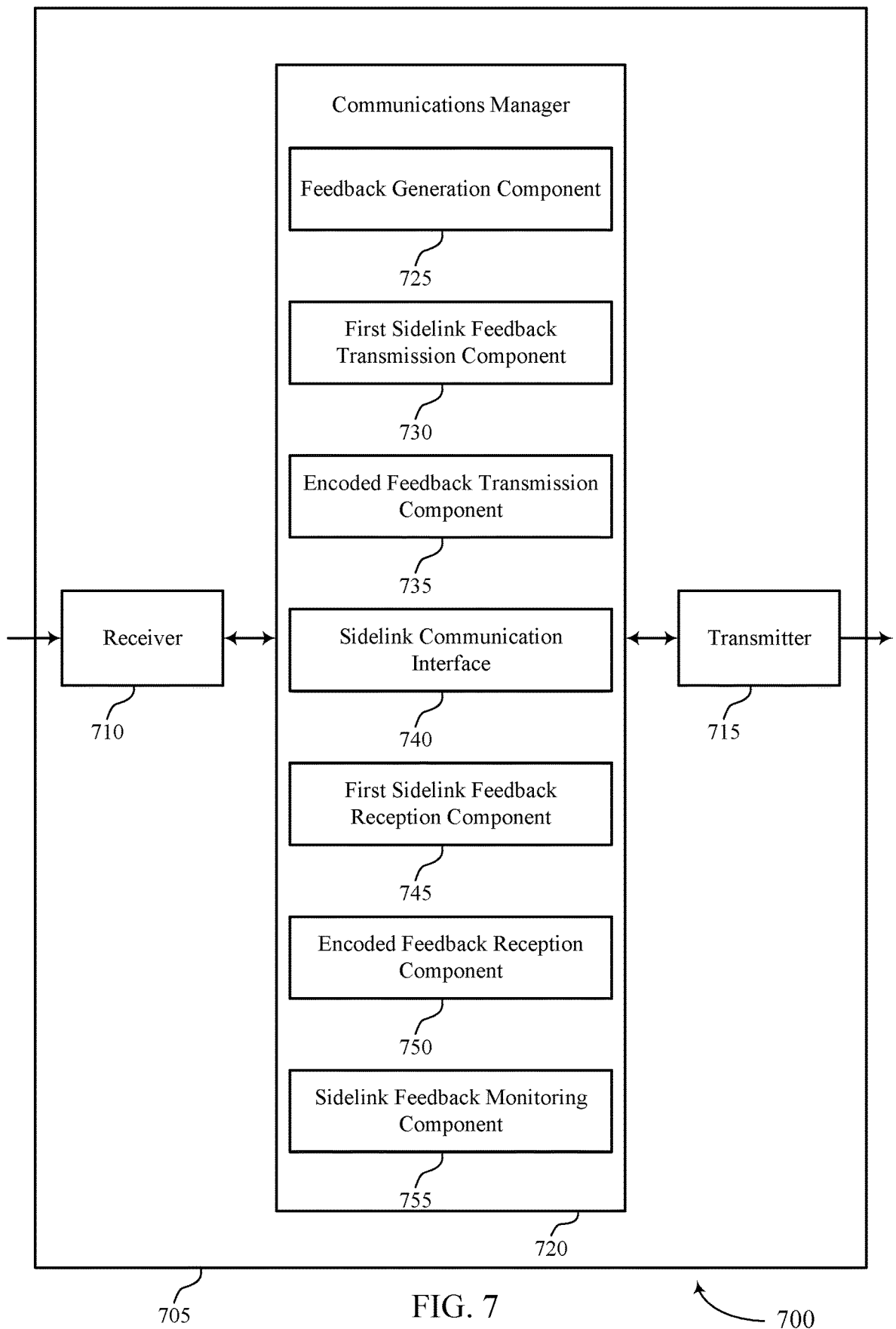

FIG. 7 shows a block diagram 700 of a device 705 that supports coded sidelink feedback for improved reliability in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to coded sidelink feedback for improved reliability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to coded sidelink feedback for improved reliability). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of coded sidelink feedback for improved reliability as described herein. For example, the communications manager 720 may include a feedback generation component 725, a first sidelink feedback transmission component 730, an encoded feedback transmission component 735, a sidelink communication interface 740, a first sidelink feedback reception component 745, an encoded feedback reception component 750, a sidelink feedback monitoring component 755, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The feedback generation component 725 may be configured as or otherwise support a means for generating a set of feedback bits corresponding to sidelink messages received via one or more sidelink channels. The first sidelink feedback transmission component 730 may be configured as or otherwise support a means for transmitting a first sidelink feedback message via a first feedback resource of a physical sidelink feedback channel occasion, the first sidelink feedback message including a first subset of feedback bits of the set of feedback bits. The encoded feedback transmission component 735 may be configured as or otherwise support a means for transmitting at least two additional sidelink feedback messages via respective feedback resources, a first additional sidelink feedback message including the first subset of feedback bits and a second subset of feedback bits of the set of feedback bits encoded using an erasure coding function.

Additionally, or alternatively, the communications manager 720 may support wireless communications at a first user equipment in accordance with examples as disclosed herein. The sidelink communication interface 740 may be configured as or otherwise support a means for transmitting at least one sidelink message via one or more sidelink channels. The first sidelink feedback reception component 745 may be configured as or otherwise support a means for receiving a first sidelink feedback message via a first feedback resource of a physical sidelink feedback channel occasion the first sidelink feedback message including a first subset of feedback bits corresponding to the at least one sidelink message. The encoded feedback reception component 750 may be configured as or otherwise support a means for receiving at least two additional sidelink feedback messages via respective feedback resources, a first additional sidelink feedback message including the first subset of feedback bits and a second subset of feedback bits encoded using an erasure coding function.

Additionally, or alternatively, the communications manager 720 may support wireless communications at a wireless device in accordance with examples as disclosed herein. The sidelink feedback monitoring component 755 may be configured as or otherwise support a means for monitoring for a first sidelink feedback message including a first subset of feedback bits and a second sidelink feedback message including a second subset of feedback bits. The encoded feedback transmission component 735 may be configured as or otherwise support a means for transmitting an additional sidelink feedback message via a feedback resource, the additional sidelink feedback message including the first subset of feedback bits and the second subset of feedback bits encoded using an erasure coding function.

Figure 8:
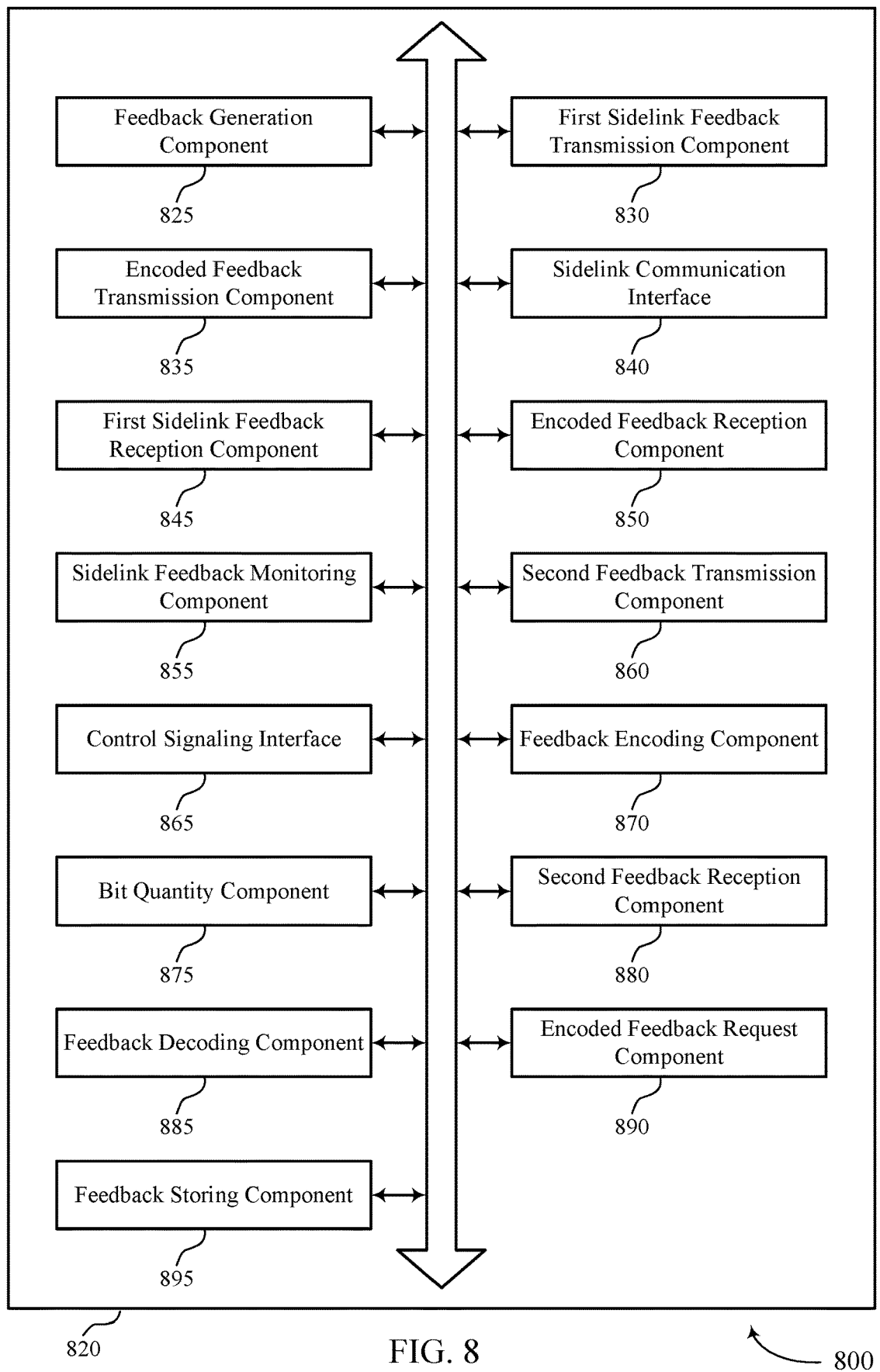
FIG. 8 shows a block diagram of a communications manager that supports coded sidelink feedback for improved reliability in accordance with one or more aspects of the present disclosure.

FIG. 8 shows a block diagram 800 of a communications manager 820 that supports coded sidelink feedback for improved reliability in accordance with one or more aspects of the present disclosure. The communications manager 820 may be an example of aspects of a communications manager 620, a communications manager 720, or both, as described herein. The communications manager 820, or various components thereof, may be an example of means for performing various aspects of coded sidelink feedback for improved reliability as described herein. For example, the communications manager 820 may include a feedback generation component 825, a first sidelink feedback transmission component 830, an encoded feedback transmission component 835, a sidelink communication interface 840, a first sidelink feedback reception component 845, an encoded feedback reception component 850, a sidelink feedback monitoring component 855, a second feedback transmission component 860, a control signaling interface 865, a feedback encoding component 870, a bit quantity component 875, a second feedback reception component 880, a feedback decoding component 885, an encoded feedback request component 890, a feedback storing component 895, or any combination thereof. Each of these components may communicate, directly or indirectly, with one another (e.g., via one or more buses).

The communications manager 820 may support wireless communications at a first UE in accordance with examples as disclosed herein. The feedback generation component 825 may be configured as or otherwise support a means for generating a set of feedback bits corresponding to sidelink messages received via one or more sidelink channels. The first sidelink feedback transmission component 830 may be configured as or otherwise support a means for transmitting a first sidelink feedback message via a first feedback resource of a physical sidelink feedback channel occasion, the first sidelink feedback message including a first subset of feedback bits of the set of feedback bits. The encoded feedback transmission component 835 may be configured as or otherwise support a means for transmitting at least two additional sidelink feedback messages via respective feedback resources, a first additional sidelink feedback message including the first subset of feedback bits and a second subset of feedback bits of the set of feedback bits encoded using an erasure coding function.

In some examples, to support transmitting at least two additional sidelink message, the second feedback transmission component 860 may be configured as or otherwise support a means for transmitting a second sidelink feedback message including the second subset of feedback bits. In some examples, to support transmitting at least two additional sidelink message, the encoded feedback transmission component 835 may be configured as or otherwise support a means for transmitting the first additional sidelink feedback message including the first subset of feedback bits and the second subset of feedback bits encoded using the erasure coding function.

In some examples, the encoded feedback transmission component 835 may be configured as or otherwise support a means for transmitting a third sidelink feedback message including the first subset of feedback bits and the second subset of feedback bits encoded using a second erasure coding function.

In some examples, the control signaling interface 865 may be configured as or otherwise support a means for receiving control signaling indicating a quantity of feedback bits to encode for inclusion in the first additional sidelink feedback message. In some examples, the feedback encoding component 870 may be configured as or otherwise support a means for encoding the first subset of feedback bits and the second subset of feedback bits using the erasure coding function based on the quantity of feedback bits.

In some examples, to support receiving the control signaling, the control signaling interface 865 may be configured as or otherwise support a means for receiving, from a second UE, a sidelink control information message indicating the quantity of feedback bits to encode.

In some examples, the bit quantity component 875 may be configured as or otherwise support a means for determining a quantity of feedback bits to encode for inclusion in the first additional sidelink feedback message based on a resource pool. In some examples, the feedback encoding component 870 may be configured as or otherwise support a means for encoding the first subset of feedback bits and the second subset of feedback bits using the erasure coding function based on based on the quantity of feedback bits.

In some examples, to support transmitting the at least two additional sidelink feedback messages, the encoded feedback transmission component 835 may be configured as or otherwise support a means for transmitting the first additional sidelink feedback message via a second feedback resource.

In some examples, the first feedback resource and the second feedback resource include adjacent orthogonal frequency multiplexed symbols of the physical sidelink feedback channel occasion.

In some examples, the first feedback resource includes a first resource block of the physical sidelink feedback channel occasion with a first cyclic shift. In some examples, the second feedback resource includes the first resource block with a second cyclic shift.

In some examples, the first feedback resource includes a first resource block of the physical sidelink feedback channel occasion. In some examples, the second feedback resource includes a second resource block of the physical sidelink feedback channel occasion.

In some examples, the first feedback resource includes a first set of bits of the physical sidelink feedback channel occasion. In some examples, the second feedback resource includes a second set of bits that are adjacent to and follow the first set of bits of the physical sidelink feedback channel occasion.

In some examples, to support transmitting the first additional sidelink feedback message via the second feedback resource, the encoded feedback transmission component 835 may be configured as or otherwise support a means for transmitting the first additional sidelink feedback message in the second feedback resource of a second physical sidelink feedback channel occasion.

In some examples, the control signaling interface 865 may be configured as or otherwise support a means for receiving control signaling indicating a second feedback resource that is used to transmit the first additional sidelink feedback message, where the second feedback resource is different from the first feedback resource that is used to transmit the first sidelink feedback message.

In some examples, the control signaling interface 865 may be configured as or otherwise support a means for receiving control signaling indicating a repetition factor for encoding the set of feedback bits, where the at least two additional sidelink feedback messages are transmitted based on the repetition factor.

In some examples, the control signaling interface 865 may be configured as or otherwise support a means for receiving control signaling indicating the erasure coding function, where the first additional sidelink feedback message is transmitted based on receiving the control signaling.

In some examples, the control signaling interface 865 may be configured as or otherwise support a means for receiving, from a second UE or from a network entity, control signaling including a request for encoded feedback, where the first additional sidelink feedback message is transmitted based on receiving the request.

In some examples, the control signaling interface 865 may be configured as or otherwise support a means for transmitting, to a second wireless device, a request that the second wireless device transmit an encoded feedback transmission including the first subset of feedback bits and the second subset of feedback bits.

Additionally, or alternatively, the communications manager 820 may support wireless communications at a first user equipment in accordance with examples as disclosed herein. The sidelink communication interface 840 may be configured as or otherwise support a means for transmitting at least one sidelink message via one or more sidelink channels. The first sidelink feedback reception component 845 may be configured as or otherwise support a means for receiving a first sidelink feedback message via a first feedback resource of a physical sidelink feedback channel occasion the first sidelink feedback message including a first subset of feedback bits corresponding to the at least one sidelink message. The encoded feedback reception component 850 may be configured as or otherwise support a means for receiving at least two additional sidelink feedback messages via respective feedback resources, a first additional sidelink feedback message including the first subset of feedback bits and a second subset of feedback bits encoded using an erasure coding function.

In some examples, to support receiving at least two additional sidelink feedback messages, the second feedback reception component 880 may be configured as or otherwise support a means for receiving a second sidelink feedback message including the second subset of feedback bits. In some examples, to support receiving at least two additional sidelink feedback messages, the encoded feedback reception component 850 may be configured as or otherwise support a means for receiving the first additional sidelink feedback message including the first subset of feedback bits and the second subset of feedback bits encoded using the erasure coding function.

In some examples, the encoded feedback reception component 850 may be configured as or otherwise support a means for receiving a third sidelink feedback message including the first subset of feedback bits and the second subset of feedback bits encoded using a second erasure coding function.

In some examples, the control signaling interface 865 may be configured as or otherwise support a means for transmitting or receiving control signaling indicating a quantity of feedback bits that are to be encoded in the first additional sidelink feedback message. In some examples, the feedback decoding component 885 may be configured as or otherwise support a means for decoding at least the first subset of feedback bits using the erasure coding function based on the quantity of feedback bits.

In some examples, to support transmitting or receiving the control signaling, the control signaling interface 865 may be configured as or otherwise support a means for transmitting, to a first UE, a sidelink control information message indicating the quantity of feedback bits to encode.

In some examples, the bit quantity component 875 may be configured as or otherwise support a means for determining a quantity of feedback bits that are to be encoded in the first additional sidelink feedback message based on a resource pool. In some examples, the feedback decoding component 885 may be configured as or otherwise support a means for decoding at least the first subset of feedback bits using the erasure coding function based on the quantity of feedback bits.

In some examples, to support receiving the at least two additional sidelink feedback messages, the encoded feedback reception component 850 may be configured as or otherwise support a means for receiving the first additional sidelink feedback message via a second feedback resource.

In some examples, the first feedback resource and the second feedback resource include adjacent orthogonal frequency multiplexed symbols of the physical sidelink feedback channel occasion.

In some examples, the first feedback resource includes a first resource block of the physical sidelink feedback channel occasion with a first cyclic shift. In some examples, the second feedback resource includes the first resource block with a second cyclic shift.

In some examples, the first feedback resource includes a first resource block of the physical sidelink feedback channel occasion. In some examples, the second feedback resource includes a second resource block of the physical sidelink feedback channel occasion.

In some examples, the first feedback resource includes a first set of bits of the physical sidelink feedback channel occasion. In some examples, the second feedback resource includes a second set of bits that are adjacent to and follow the first set of bits of the physical sidelink feedback channel occasion.

In some examples, to support receiving the first additional sidelink feedback message via the second feedback resource, the encoded feedback reception component 850 may be configured as or otherwise support a means for receiving the first additional sidelink feedback message in the second feedback resource of a second physical sidelink feedback channel occasion.

In some examples, the control signaling interface 865 may be configured as or otherwise support a means for receiving control signaling indicating a second feedback resource that is used to receive the first additional sidelink feedback message, where the second feedback resource is different from a first feedback resource that is used to receive the first sidelink feedback message.

In some examples, the control signaling interface 865 may be configured as or otherwise support a means for receiving control signaling indicating a repetition factor for feedback bit encoding, where the first additional sidelink feedback message is received based on the repetition factor.

In some examples, the control signaling interface 865 may be configured as or otherwise support a means for receiving control signaling indicating the erasure coding function, where the first additional sidelink feedback message is received based on receiving the control signaling.

In some examples, the control signaling interface 865 may be configured as or otherwise support a means for transmitting, to a second wireless device, control signaling including a request for encoded feedback, where the first additional sidelink feedback message is received from the second wireless device based on transmitting the request, where the second wireless device is a network entity or a second UE.

In some examples, the first sidelink feedback message is received from a second UE. In some examples, the first additional sidelink feedback message is received from a third UE or a network entity.

Additionally, or alternatively, the communications manager 820 may support wireless communications at a wireless device in accordance with examples as disclosed herein. The sidelink feedback monitoring component 855 may be configured as or otherwise support a means for monitoring for a first sidelink feedback message including a first subset of feedback bits and a second sidelink feedback message including a second subset of feedback bits. In some examples, the encoded feedback transmission component 835 may be configured as or otherwise support a means for transmitting an additional sidelink feedback message via a feedback resource, the additional sidelink feedback message including the first subset of feedback bits and the second subset of feedback bits encoded using an erasure coding function.

In some examples, the encoded feedback request component 890 may be configured as or otherwise support a means for receiving, from a UE, a request for encoded feedback, where the additional sidelink feedback message is transmitted based on receiving the request.

In some examples, the feedback storing component 895 may be configured as or otherwise support a means for storing the first subset of feedback bits and the second subset of feedback bits for a time period, where the request is received during the time period.

In some examples, the control signaling interface 865 may be configured as or otherwise support a means for transmitting control signaling indicating a quantity of feedback bits that are to be encoded for inclusion in the first additional sidelink feedback message. In some examples, the feedback encoding component 870 may be configured as or otherwise support a means for encoding the first subset of feedback bits and the second subset of feedback bits using the erasure coding function based on the quantity of feedback bits.

In some examples, the bit quantity component 875 may be configured as or otherwise support a means for determining a quantity of feedback bits to encode for inclusion in the first additional sidelink feedback message based on a resource pool. In some examples, the feedback encoding component 870 may be configured as or otherwise support a means for encoding the first subset of feedback bits and the second subset of feedback bits using the erasure coding function based on the quantity of feedback bits.

In some examples, the control signaling interface 865 may be configured as or otherwise support a means for receiving control signaling indicating the erasure coding function, where the first additional sidelink feedback message is transmitted based on receiving the control signaling.

In some examples, the control signaling interface 865 may be configured as or otherwise support a means for transmitting, to one or more user equipments (UEs) control signaling indicating the erasure coding function.

In some examples, the control signaling interface 865 may be configured as or otherwise support a means for receiving control signaling indicating a repetition factor for encoding feedback bits, where the first additional sidelink feedback message is transmitted based on the repetition factor.

In some examples, the control signaling interface 865 may be configured as or otherwise support a means for transmitting or receiving control signaling indicating a feedback resource that the wireless device is to use for transmitting the first additional sidelink feedback message.

In some examples, the control signaling interface 865 may be configured as or otherwise support a means for transmitting control signaling indicating a capability of to transmit encoded feedback.

In some examples, the capability indicates a maximum quantity of feedback bits that the wireless device is able to store in support of transmitting the encoded feedback. In some examples, the wireless device is another UE or a network entity.

Figure 9:
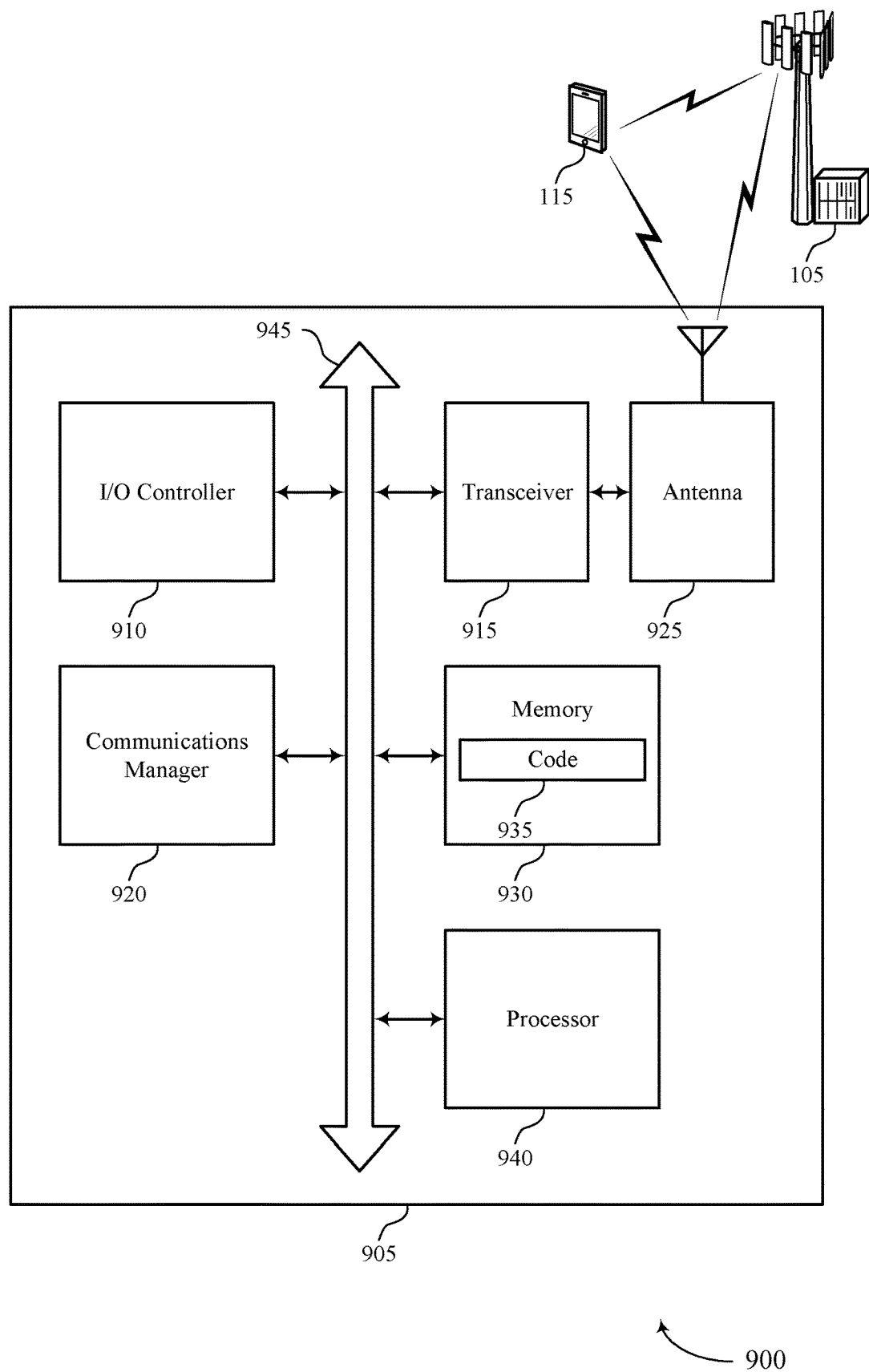
FIG. 9 shows a diagram of a system including a device that supports coded sidelink feedback for improved reliability in accordance with one or more aspects of the present disclosure.

FIG. 9 shows a diagram of a system 900 including a device 905 that supports coded sidelink feedback for improved reliability in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting coded sidelink feedback for improved reliability). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for generating a set of feedback bits corresponding to sidelink messages received via one or more sidelink channels. The communications manager 920 may be configured as or otherwise support a means for transmitting a first sidelink feedback message via a first feedback resource of a physical sidelink feedback channel occasion, the first sidelink feedback message including a first subset of feedback bits of the set of feedback bits. The communications manager 920 may be configured as or otherwise support a means for transmitting at least two additional sidelink feedback messages via respective feedback resources, a first additional sidelink feedback message including the first subset of feedback bits and a second subset of feedback bits of the set of feedback bits encoded using an erasure coding function.

Additionally, or alternatively, the communications manager 920 may support wireless communications at a first user equipment in accordance with examples as disclosed herein. For example, the communications manager 920 may be configured as or otherwise support a means for transmitting at least one sidelink message via one or more sidelink channels. The communications manager 920 may be configured as or otherwise support a means for receiving a first sidelink feedback message via a first feedback resource of a physical sidelink feedback channel occasion the first sidelink feedback message including a first subset of feedback bits corresponding to the at least one sidelink message. The communications manager 920 may be configured as or otherwise support a means for receiving at least two additional sidelink feedback messages via respective feedback resources, a first additional sidelink feedback message including the first subset of feedback bits and a second subset of feedback bits encoded using an erasure coding function.

Additionally, or alternatively, the communications manager 920 may support wireless communications at a wireless device in accordance with examples as disclosed herein. For example, the communications manager 920 may be configured as or otherwise support a means for monitoring for a first sidelink feedback message including a first subset of feedback bits and a second sidelink feedback message including a second subset of feedback bits. The communications manager 920 may be configured as or otherwise support a means for transmitting an additional sidelink feedback message via a feedback resource, the additional sidelink feedback message including the first subset of feedback bits and the second subset of feedback bits encoded using an erasure coding function.

By including or configuring the communications manager 920 in accordance with examples as described herein, the device 905 may support techniques for improved communication reliability and improved network throughput, as utilization of encoded sidelink feedback may support increased likelihood of successful sidelink feedback transmission. Additionally, the use of network coding may support improved robustness in the network, as network coding may prevent or limit retransmissions of feedback by UEs.

In some examples, the communications manager 920 may be configured to perform various operations (e.g., receiving, monitoring, transmitting) using or otherwise in cooperation with the transceiver 915, the one or more antennas 925, or any combination thereof Although the communications manager 920 is illustrated as a separate component, in some examples, one or more functions described herein with reference to the communications manager 920 may be supported by or performed by the processor 940, the memory 930, the code 935, or any combination thereof. For example, the code 935 may include instructions executable by the processor 940 to cause the device 905 to perform various aspects of coded sidelink feedback for improved reliability as described herein, or the processor 940 and the memory 930 may be otherwise configured to perform or support such operations.

Figure 10:
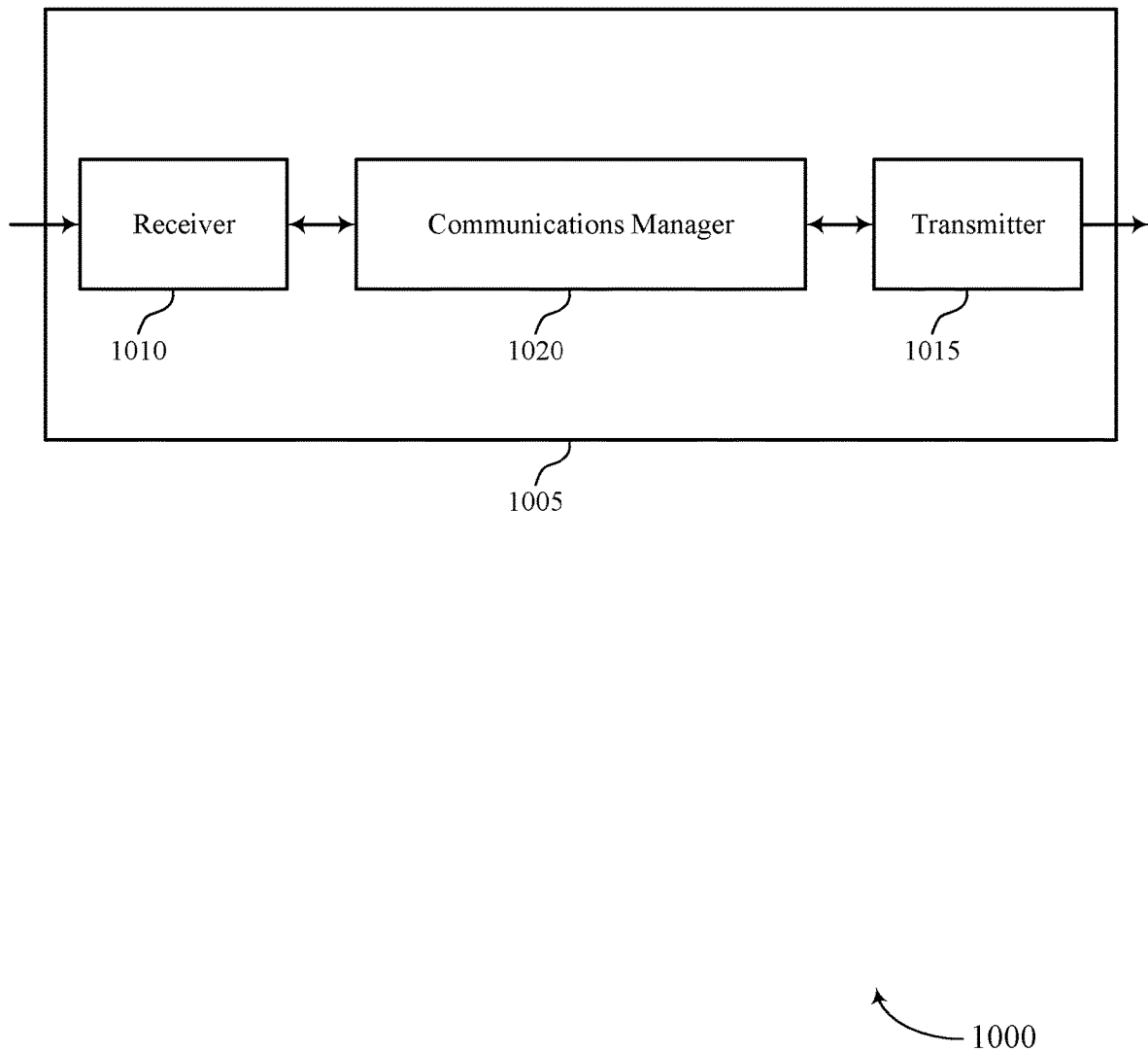
FIGS. 10 and 11 show block diagrams of devices that support coded sidelink feedback for improved reliability in accordance with one or more aspects of the present disclosure.

FIG. 10 shows a block diagram 1000 of a device 1005 that supports coded sidelink feedback for improved reliability in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of coded sidelink feedback for improved reliability as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a wireless device in accordance with examples as disclosed herein. For example, the communications manager 1020 may be configured as or otherwise support a means for monitoring for a first sidelink feedback message including a first subset of feedback bits and a second sidelink feedback message including a second subset of feedback bits. The communications manager 1020 may be configured as or otherwise support a means for transmitting an additional sidelink feedback message via a feedback resource, the additional sidelink feedback message including the first subset of feedback bits and the second subset of feedback bits encoded using an erasure coding function.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing due to dropped or erased feedback, as encoding feedback may support increased likelihood of successful transmission of feedback.

Figure 11:
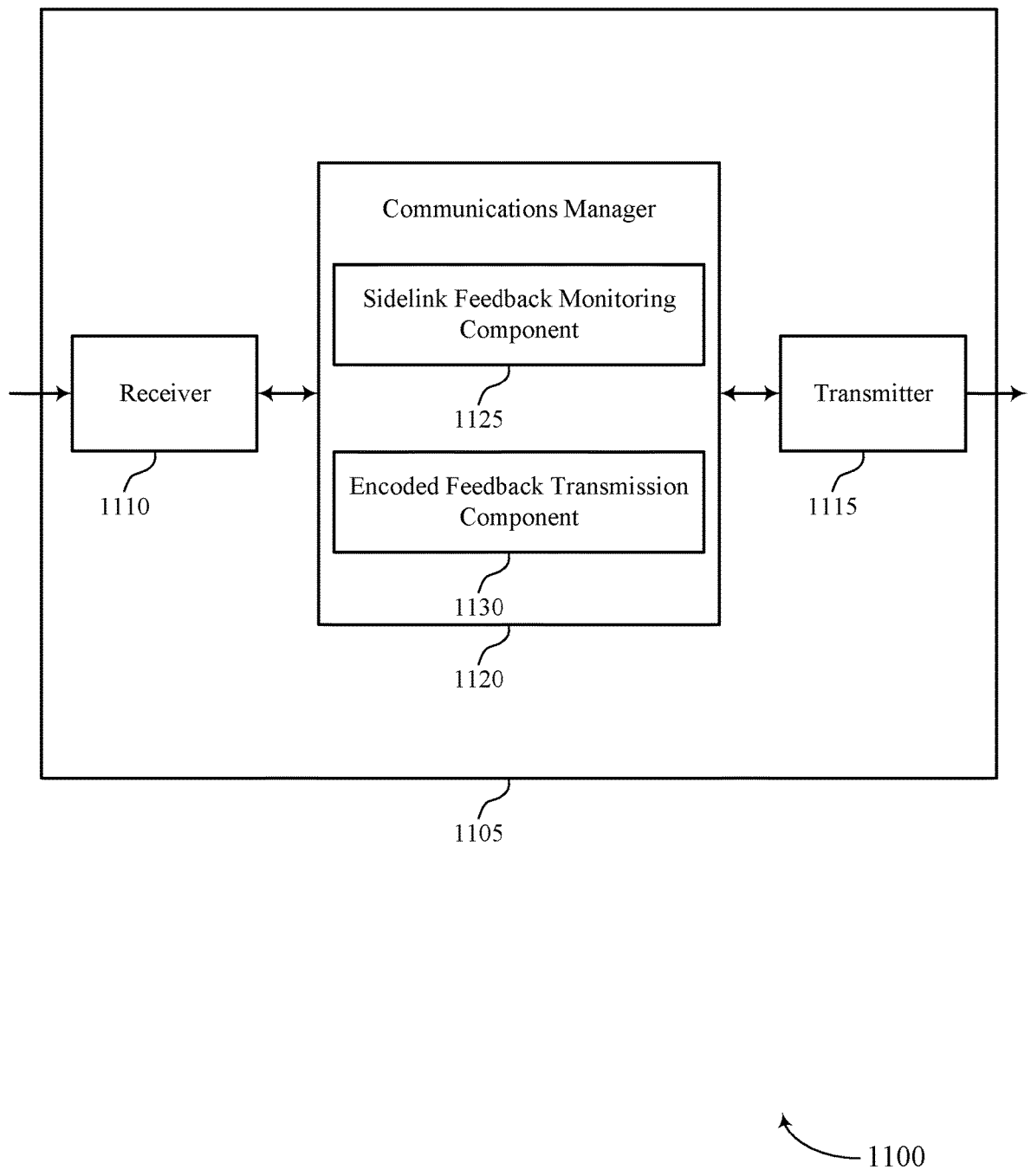

FIG. 11 shows a block diagram 1100 of a device 1105 that supports coded sidelink feedback for improved reliability in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of coded sidelink feedback for improved reliability as described herein. For example, the communications manager 1120 may include a sidelink feedback monitoring component 1125 an encoded feedback transmission component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a wireless device in accordance with examples as disclosed herein. The sidelink feedback monitoring component 1125 may be configured as or otherwise support a means for monitoring for a first sidelink feedback message including a first subset of feedback bits and a second sidelink feedback message including a second subset of feedback bits. The encoded feedback transmission component 1130 may be configured as or otherwise support a means for transmitting an additional sidelink feedback messages via a feedback resource, the additional sidelink feedback message including the first subset of feedback bits and the second subset of feedback bits encoded using an erasure coding function.

Figure 12:
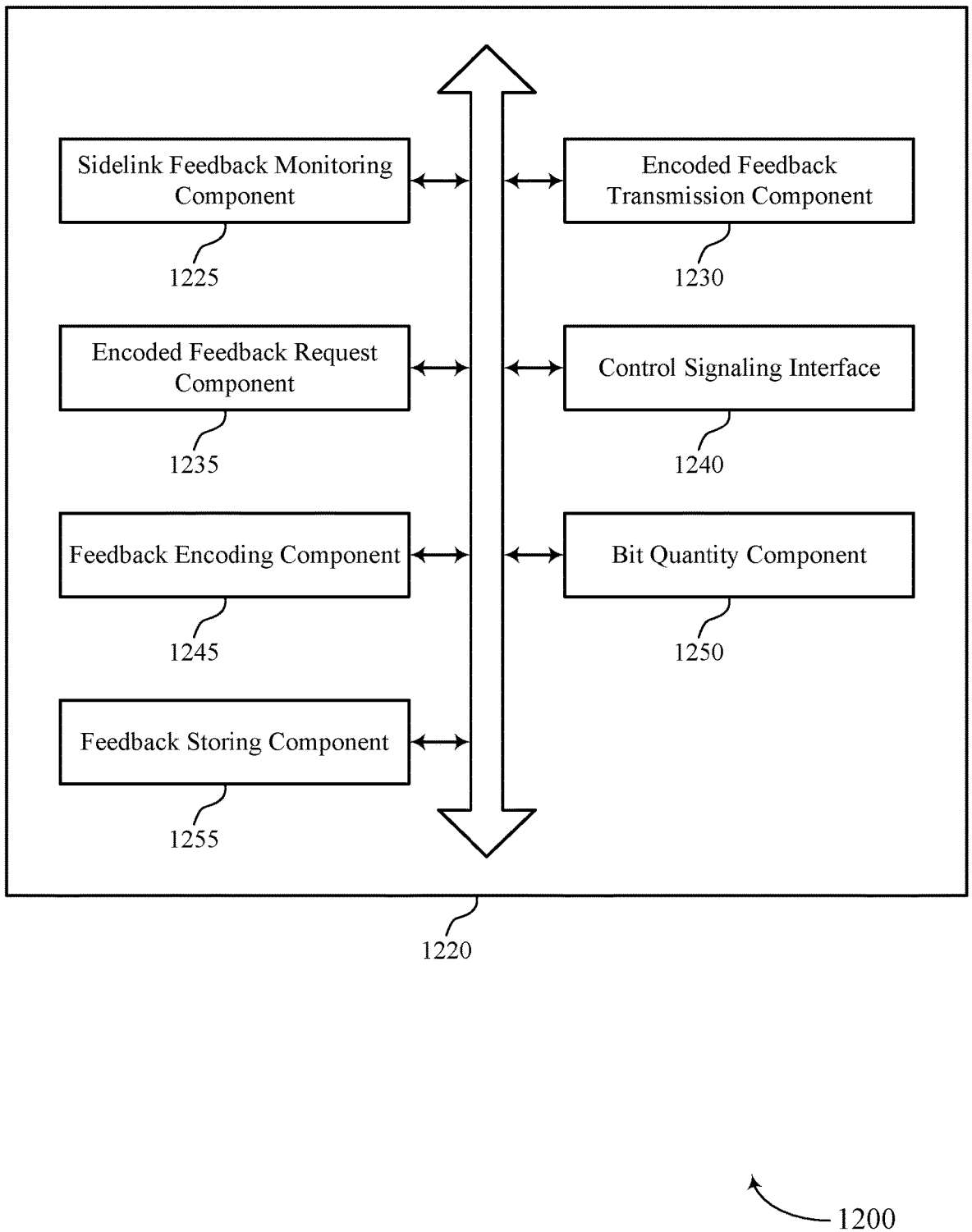
FIG. 12 shows a block diagram of a communications manager that supports coded sidelink feedback for improved reliability in accordance with one or more aspects of the present disclosure.

FIG. 12 shows a block diagram 1200 of a communications manager 1220 that supports coded sidelink feedback for improved reliability in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of coded sidelink feedback for improved reliability as described herein. For example, the communications manager 1220 may include a sidelink feedback monitoring component 1225, an encoded feedback transmission component 1230, an encoded feedback request component 1235, a control signaling interface 1240, a feedback encoding component 1245, a bit quantity component 1250, a feedback storing component 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a wireless device in accordance with examples as disclosed herein. The sidelink feedback monitoring component 1225 may be configured as or otherwise support a means for monitoring for a first sidelink feedback message including a first subset of feedback bits and a second sidelink feedback message including a second subset of feedback bits. The encoded feedback transmission component 1230 may be configured as or otherwise support a means for transmitting an additional sidelink feedback messages via a feedback resource, the additional sidelink feedback message including the first subset of feedback bits and the second subset of feedback bits encoded using an erasure coding function.

In some examples, the encoded feedback request component 1235 may be configured as or otherwise support a means for receiving, from a UE, a request for encoded feedback, where the additional sidelink feedback message is transmitted based on receiving the request.

In some examples, the feedback storing component 1255 may be configured as or otherwise support a means for storing the first subset of feedback bits and the second subset of feedback bits for a time period, where the request is received during the time period.

In some examples, the control signaling interface 1240 may be configured as or otherwise support a means for transmitting control signaling indicating a quantity of feedback bits that are to be encoded for inclusion in the first additional sidelink feedback message. In some examples, the feedback encoding component 1245 may be configured as or otherwise support a means for encoding the first subset of feedback bits and the second subset of feedback bits using the erasure coding function based on the quantity of feedback bits.

In some examples, the bit quantity component 1250 may be configured as or otherwise support a means for determining a quantity of feedback bits to encode for inclusion in the first additional sidelink feedback message based on a resource pool. In some examples, the feedback encoding component 1245 may be configured as or otherwise support a means for encoding the first subset of feedback bits and the second subset of feedback bits using the erasure coding function based on the quantity of feedback bits.

In some examples, the control signaling interface 1240 may be configured as or otherwise support a means for receiving control signaling indicating the erasure coding function, where the first additional sidelink feedback message is transmitted based on receiving the control signaling.

In some examples, the control signaling interface 1240 may be configured as or otherwise support a means for transmitting, to one or more user equipments (UEs) control signaling indicating the erasure coding function.

In some examples, the control signaling interface 1240 may be configured as or otherwise support a means for receiving control signaling indicating a repetition factor for encoding feedback bits, where the first additional sidelink feedback message is transmitted based on the repetition factor.

In some examples, the control signaling interface 1240 may be configured as or otherwise support a means for transmitting or receiving control signaling indicating a feedback resource that the wireless device is to use for transmitting the first additional sidelink feedback message.

In some examples, the control signaling interface 1240 may be configured as or otherwise support a means for transmitting control signaling indicating a capability of to transmit encoded feedback.

In some examples, the capability indicates a maximum quantity of feedback bits that the wireless device is able to store in support of transmitting the encoded feedback. In some examples, the wireless device is another UE or a network entity.

Figure 13:
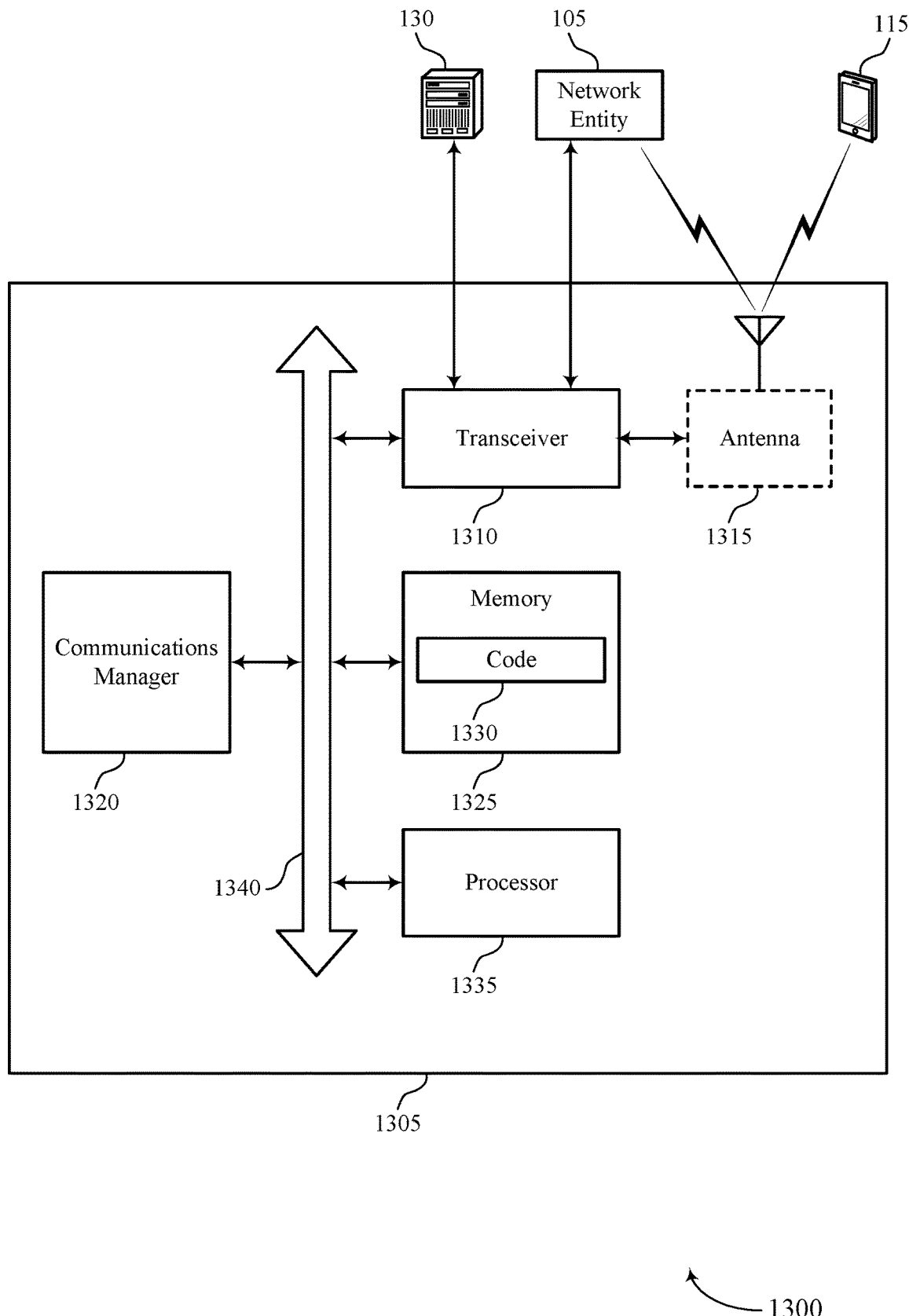
FIG. 13 shows a diagram of a system including a device that supports coded sidelink feedback for improved reliability in accordance with one or more aspects of the present disclosure.

FIG. 13 shows a diagram of a system 1300 including a device 1305 that supports coded sidelink feedback for improved reliability in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting coded sidelink feedback for improved reliability). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a wireless device in accordance with examples as disclosed herein. For example, the communications manager 1320 may be configured as or otherwise support a means for monitoring for a first sidelink feedback message including a first subset of feedback bits and a second sidelink feedback message including a second subset of feedback bits. The communications manager 1320 may be configured as or otherwise support a means for transmitting an additional sidelink feedback messages via a feedback resource, the additional sidelink feedback message including the first subset of feedback bits and the second subset of feedback bits encoded using an erasure coding function.

By including or configuring the communications manager 1320 in accordance with examples as described herein, the device 1305 may support techniques for improved communication reliability and improved throughput, as using encoded feedback may support improved likelihood that a receiver is able to successfully decode feedback. Further, the use of network coding for sidelink feedback may improve throughput as UEs may not retransmit feedback.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof Although the communications manager 1320 is illustrated as a separate component, in some examples, one or more functions described herein with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of coded sidelink feedback for improved reliability as described herein, or the processor 1335 and the memory 1325 may be otherwise configured to perform or support such operations.

Figure 14:
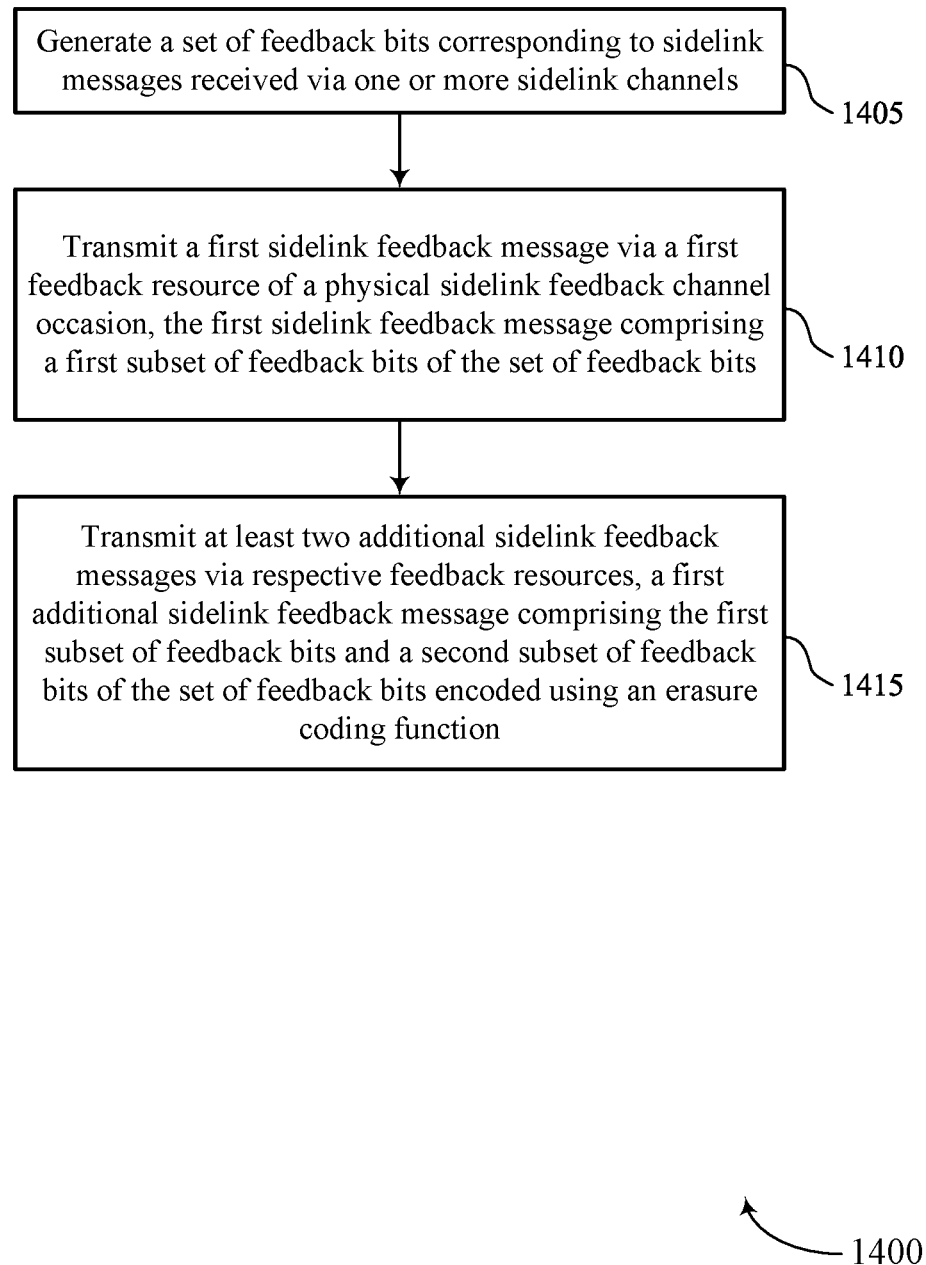
FIGS. 14 through 16 show flowcharts illustrating methods that support coded sidelink feedback for improved reliability in accordance with one or more aspects of the present disclosure.

FIG. 14 shows a flowchart illustrating a method 1400 that supports coded sidelink feedback for improved reliability in accordance with one or more aspects of the present disclosure. The operations of the method 1400 may be implemented by a UE or its components as described herein. For example, the operations of the method 1400 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include generating a set of feedback bits corresponding to sidelink messages received via one or more sidelink channels. The operations of 1405 may be performed in accordance with examples as disclosed herein. In some examples, aspects of the operations of 1405 may be performed by a feedback generation component 825 as described herein with reference to FIG. 8.

At 1410, the method may include transmitting a first sidelink feedback message via a first feedback resource of a physical sidelink feedback channel occasion, the first sidelink feedback message comprising a first subset of feedback bits of the set of feedback bits. The operations of 1410 may be performed in accordance with examples as disclosed herein. In some examples, aspects of the operations of 1410 may be performed by a first sidelink feedback transmission component 830 as described herein with reference to FIG. 8.

At 1415, the method may include transmitting at least two additional sidelink feedback messages via respective feedback resources, a first additional sidelink feedback message comprising the first subset of feedback bits and a second subset of feedback bits of the set of feedback bits encoded using an erasure coding function. The operations of 1415 may be performed in accordance with examples as disclosed herein. In some examples, aspects of the operations of 1415 may be performed by an encoded feedback transmission component 835 as described herein with reference to FIG. 8.

Figure 15:
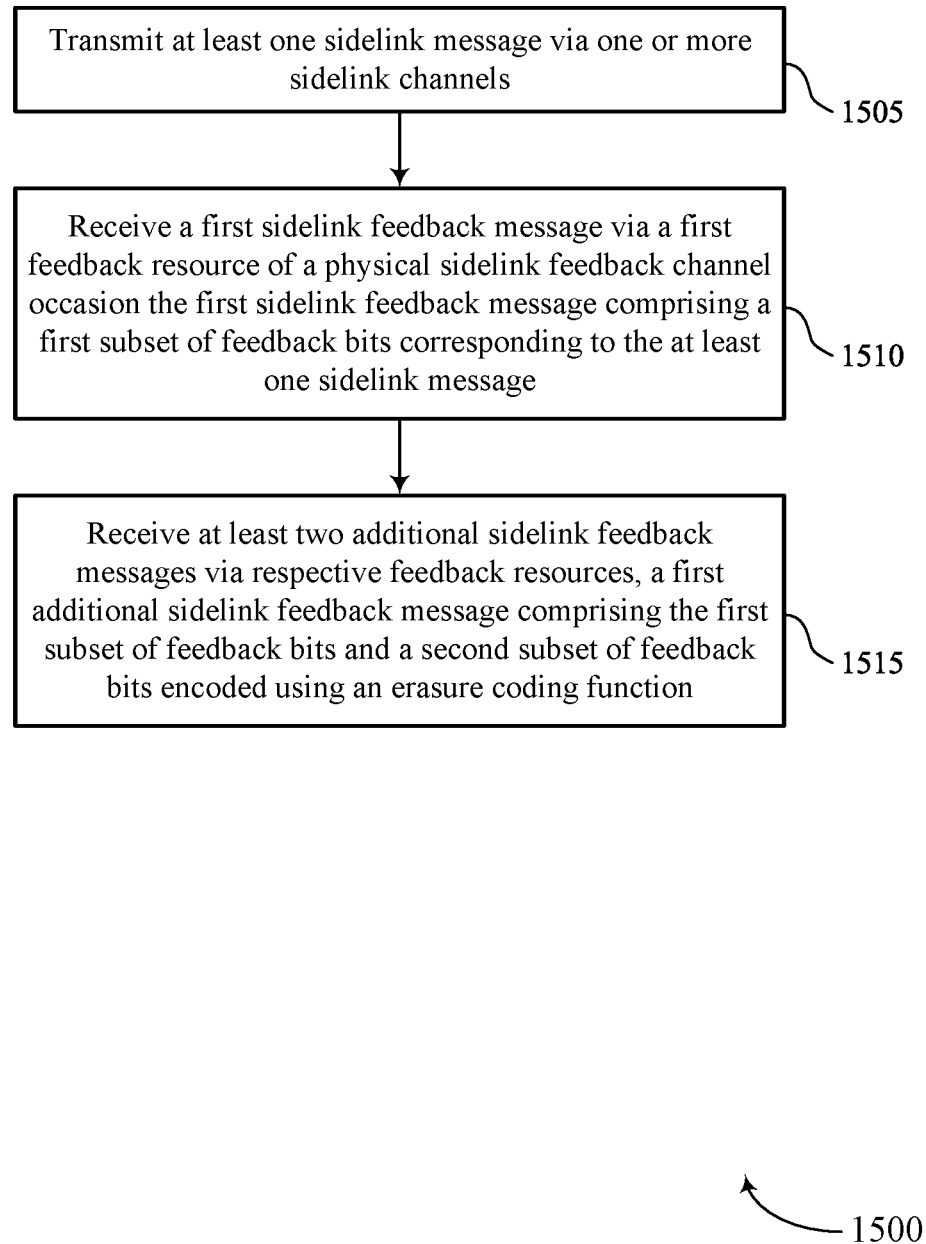

FIG. 15 shows a flowchart illustrating a method 1500 that supports coded sidelink feedback for improved reliability in accordance with one or more aspects of the present disclosure. The operations of the method 1500 may be implemented by a UE or its components as described herein. For example, the operations of the method 1500 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting at least one sidelink message via one or more sidelink channels. The operations of 1505 may be performed in accordance with examples as disclosed herein. In some examples, aspects of the operations of 1505 may be performed by a sidelink communication interface 840 as described herein with reference to FIG. 8.

At 1510, the method may include receiving a first sidelink feedback message via a first feedback resource of a physical sidelink feedback channel occasion the first sidelink feedback message comprising a first subset of feedback bits corresponding to the at least one sidelink message. The operations of 1510 may be performed in accordance with examples as disclosed herein. In some examples, aspects of the operations of 1510 may be performed by a first sidelink feedback reception component 845 as described herein with reference to FIG. 8.

At 1515, the method may include receiving at least two additional sidelink feedback messages via respective feedback resources, a first additional sidelink feedback message comprising the first subset of feedback bits and a second subset of feedback bits encoded using an erasure coding function. The operations of 1515 may be performed in accordance with examples as disclosed herein. In some examples, aspects of the operations of 1515 may be performed by an encoded feedback reception component 850 as described herein with reference to FIG. 8.

Figure 16:
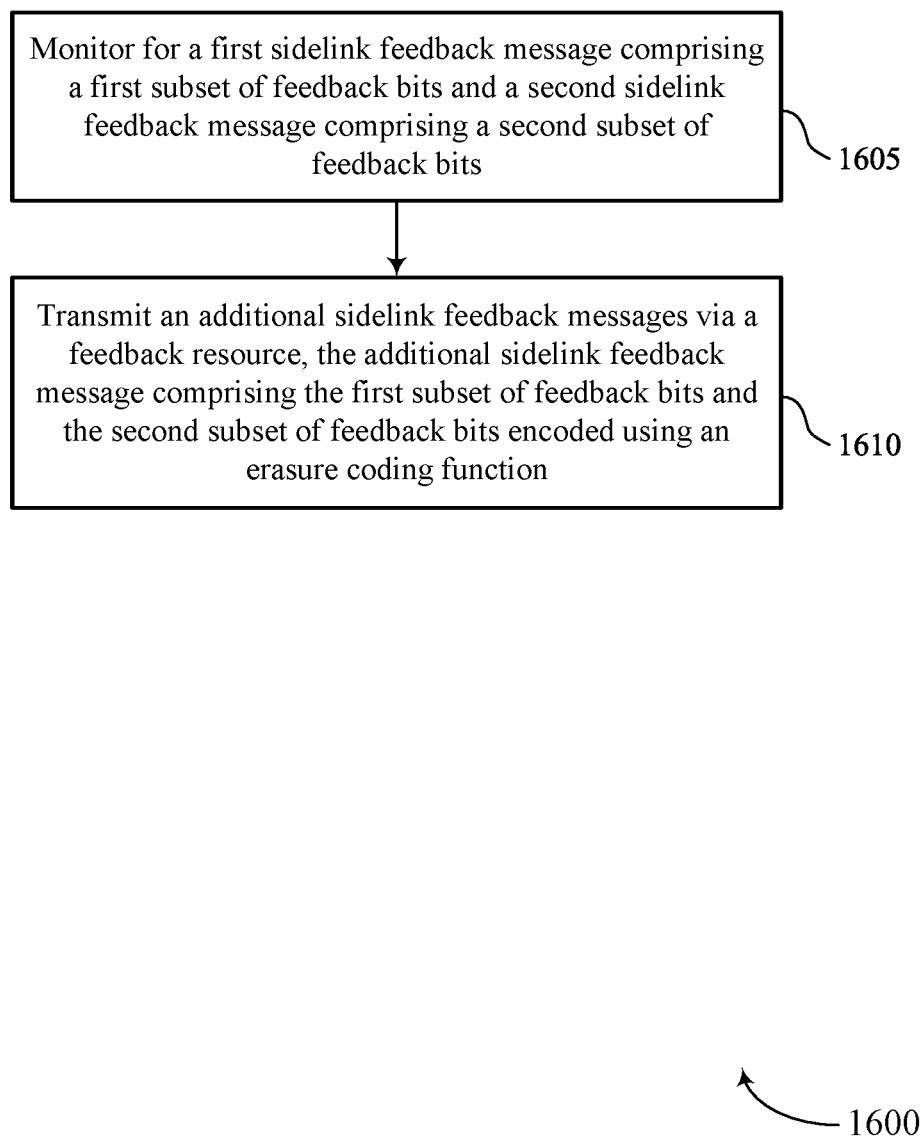

FIG. 16 shows a flowchart illustrating a method 1600 that supports coded sidelink feedback for improved reliability in accordance with one or more aspects of the present disclosure. The operations of the method 1600 may be implemented by a UE or a network entity or its components as described herein. For example, the operations of the method 1600 may be performed by a UE 115 as described herein with reference to FIGS. 1 through 9 or a network entity as described herein with reference to FIGS. 1 through 5 and 10 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include monitoring for a first sidelink feedback message comprising a first subset of feedback bits and a second sidelink feedback message comprising a second subset of feedback bits. The operations of 1605 may be performed in accordance with examples as disclosed herein. In some examples, aspects of the operations of 1605 may be performed by a sidelink feedback monitoring component 855 or a sidelink feedback monitoring component 1225 as described herein with reference to FIGS. 8 and 12.

At 1610, the method may include transmitting an additional sidelink feedback messages via a feedback resource, the additional sidelink feedback message comprising the first subset of feedback bits and the second subset of feedback bits encoded using an erasure coding function. The operations of 1610 may be performed in accordance with examples as disclosed herein. In some examples, aspects of the operations of 1610 may be performed by an encoded feedback transmission component 835 or an encoded feedback transmission component 1230 as described herein with reference to FIGS. 8 and 12.

The following provides an overview of aspects of the present disclosure:

Aspect 1: A method for wireless communications at a first UE, comprising: generating a set of feedback bits corresponding to sidelink messages received via one or more sidelink channels; transmitting a first sidelink feedback message via a first feedback resource of a physical sidelink feedback channel occasion, the first sidelink feedback message comprising a first subset of feedback bits of the set of feedback bits; and transmitting at least two additional sidelink feedback messages via respective feedback resources, a first additional sidelink feedback message comprising the first subset of feedback bits and a second subset of feedback bits of the set of feedback bits encoded using an erasure coding function.

Aspect 2: The method of aspect 1, wherein transmitting at least two additional sidelink message comprises: transmitting a second sidelink feedback message comprising the second subset of feedback bits; and transmitting the first additional sidelink feedback message comprising the first subset of feedback bits and the second subset of feedback bits encoded using the erasure coding function.

Aspect 3: The method of any of aspects 1 through 2, further comprising: transmitting a third sidelink feedback message comprising the first subset of feedback bits and the second subset of feedback bits encoded using a second erasure coding function.

Aspect 4: The method of any of aspects 1 through 3, further comprising: receiving control signaling indicating a quantity of feedback bits to encode for inclusion in the first additional sidelink feedback message; and encoding the first subset of feedback bits and the second subset of feedback bits using the erasure coding function based at least in part on the quantity of feedback bits.

Aspect 5: The method of aspect 4, wherein receiving the control signaling comprises: receiving, from a second UE, a sidelink control information message indicating the quantity of feedback bits to encode.

Aspect 6: The method of any of aspects 1 through 5, further comprising: determining a quantity of feedback bits to encode for inclusion in the first additional sidelink feedback message based at least in part on a resource pool; and encoding the first subset of feedback bits and the second subset of feedback bits using the erasure coding function based at least in part on based at least in part on the quantity of feedback bits.

Aspect 7: The method of any of aspects 1 through 6, wherein transmitting the at least two additional sidelink feedback messages comprises: transmitting the first additional sidelink feedback message via a second feedback resource.

Aspect 8: The method of aspect 7, wherein the first feedback resource and the second feedback resource comprise adjacent orthogonal frequency multiplexed symbols of the physical sidelink feedback channel occasion.

Aspect 9: The method of aspect 7, wherein the first feedback resource comprises a first resource block of the physical sidelink feedback channel occasion with a first cyclic shift; and the second feedback resource comprises the first resource block with a second cyclic shift.

Aspect 10: The method of aspect 7, wherein the first feedback resource comprises a first resource block of the physical sidelink feedback channel occasion; and the second feedback resource comprises a second resource block of the physical sidelink feedback channel occasion.

Aspect 11: The method of aspect 7, wherein the first feedback resource comprises a first set of bits of the physical sidelink feedback channel occasion; and the second feedback resource comprises a second set of bits that are adjacent to and follow the first set of bits of the physical sidelink feedback channel occasion.

Aspect 12: The method of aspect 7, wherein transmitting the first additional sidelink feedback message via the second feedback resource comprises: transmitting the first additional sidelink feedback message in the second feedback resource of a second physical sidelink feedback channel occasion.

Aspect 13: The method of any of aspects 1 through 12, further comprising: receiving control signaling indicating a second feedback resource that is used to transmit the first additional sidelink feedback message, wherein the second feedback resource is different from the first feedback resource that is used to transmit the first sidelink feedback message.

Aspect 14: The method of any of aspects 1 through 13, further comprising: receiving control signaling indicating a repetition factor for encoding the set of feedback bits, wherein the at least two additional sidelink feedback messages are transmitted based at least in part on the repetition factor.

Aspect 15: The method of any of aspects 1 through 14, further comprising: receiving control signaling indicating the erasure coding function, wherein the first additional sidelink feedback message is transmitted based at least in part on receiving the control signaling.

Aspect 16: The method of any of aspects 1 through 15, further comprising: receiving, from a second UE or from a network entity, control signaling comprising a request for encoded feedback, wherein the first additional sidelink feedback message is transmitted based at least in part on receiving the request.

Aspect 17: The method of any of aspects 1 through 16, further comprising: transmitting, to a second wireless device, a request that the second wireless device transmit an encoded feedback transmission comprising the first subset of feedback bits and the second subset of feedback bits.

Aspect 18: A method for wireless communications at a first user equipment, comprising: transmitting at least one sidelink message via one or more sidelink channels; receiving a first sidelink feedback message via a first feedback resource of a physical sidelink feedback channel occasion, the first sidelink feedback message comprising a first subset of feedback bits corresponding to the at least one sidelink message; and receiving at least two additional sidelink feedback messages via respective feedback resources, a first additional sidelink feedback message comprising the first subset of feedback bits and a second subset of feedback bits encoded using an erasure coding function.

Aspect 19: The method of aspect 18, wherein receiving at least two additional sidelink feedback messages comprises: receiving a second sidelink feedback message comprising the second subset of feedback bits; and receiving the first additional sidelink feedback message comprising the first subset of feedback bits and the second subset of feedback bits encoded using the erasure coding function.

Aspect 20: The method of any of aspects 18 through 19, further comprising: receiving a third sidelink feedback message comprising the first subset of feedback bits and the second subset of feedback bits encoded using a second erasure coding function.

Aspect 21: The method of any of aspects 18 through 20, further comprising: transmitting or receiving control signaling indicating a quantity of feedback bits that are to be encoded in the first additional sidelink feedback message; and decoding at least the first subset of feedback bits using the erasure coding function based at least in part on the quantity of feedback bits.

Aspect 22: The method of aspect 21, wherein transmitting or receiving the control signaling comprises: transmitting, to a first UE, a sidelink control information message indicating the quantity of feedback bits to encode.

Aspect 23: The method of any of aspects 18 through 22, further comprising: determining a quantity of feedback bits that are to be encoded in the first additional sidelink feedback message based at least in part on a resource pool; and decoding at least the first subset of feedback bits using the erasure coding function based at least in part on the quantity of feedback bits.

Aspect 24: The method of any of aspects 18 through 23, wherein receiving the at least two additional sidelink feedback messages comprises: receiving the first additional sidelink feedback message via a second feedback resource.

Aspect 25: The method of aspect 24, wherein the first feedback resource and the second feedback resource comprise adjacent orthogonal frequency multiplexed symbols of the physical sidelink feedback channel occasion.

Aspect 26: The method of aspect 24, wherein the first feedback resource comprises a first resource block of the physical sidelink feedback channel occasion with a first cyclic shift; and the second feedback resource comprises the first resource block with a second cyclic shift.

Aspect 27: The method of aspect 24, wherein the first feedback resource comprises a first resource block of the physical sidelink feedback channel occasion; and the second feedback resource comprises a second resource block of the physical sidelink feedback channel occasion.

Aspect 28: The method of aspect 24, wherein the first feedback resource comprises a first set of bits of the physical sidelink feedback channel occasion; and the second feedback resource comprises a second set of bits that are adjacent to and follow the first set of bits of the physical sidelink feedback channel occasion.

Aspect 29: The method of aspect 24, wherein receiving the first additional sidelink feedback message via the second feedback resource comprises: receiving the first additional sidelink feedback message in the second feedback resource of a second physical sidelink feedback channel occasion.

Aspect 30: The method of any of aspects 24 through 29, further comprising: receiving control signaling indicating a second feedback resource that is used to receive the first additional sidelink feedback message, wherein the second feedback resource is different from a first feedback resource that is used to receive the first sidelink feedback message.

Aspect 31: The method of any of aspects 24 through 30, further comprising: receiving control signaling indicating a repetition factor for feedback bit encoding, wherein the first additional sidelink feedback message is received based at least in part on the repetition factor.

Aspect 32: The method of any of aspects 24 through 31, further comprising: receiving control signaling indicating the erasure coding function, wherein the first additional sidelink feedback message is received based at least in part on receiving the control signaling.

Aspect 33: The method of any of aspects 24 through 32, further comprising: transmitting, to a second wireless device, control signaling including a request for encoded feedback, wherein the first additional sidelink feedback message is received from the second wireless device based at least in part on transmitting the request, wherein the second wireless device is a network entity or a second UE.

Aspect 34: The method of any of aspects 24 through 33, wherein the first sidelink feedback message is received from a second UE; and the first additional sidelink feedback message is received from a third UE or a network entity.

Aspect 35: A method for wireless communications at a wireless device, comprising: monitoring for a first sidelink feedback message comprising a first subset of feedback bits and a second sidelink feedback message comprising a second subset of feedback bits; and transmitting an additional sidelink feedback message via a feedback resource, the additional sidelink feedback message comprising the first subset of feedback bits and the second subset of feedback bits encoded using an erasure coding function.

Aspect 36: The method of aspect 35, further comprising: receiving, from a UE, a request for encoded feedback, wherein the additional sidelink feedback message is transmitted based at least in part on receiving the request.

Aspect 37: The method of aspect 36, further comprising: storing the first subset of feedback bits and the second subset of feedback bits for a time period, wherein the request is received during the time period.

Aspect 38: The method of any of aspects 35 through 37, further comprising: transmitting control signaling indicating a quantity of feedback bits that are to be encoded for inclusion in the additional sidelink feedback message; and encoding the first subset of feedback bits and the second subset of feedback bits using the erasure coding function based at least in part on the quantity of feedback bits.

Aspect 39: The method of any of aspects 35 through 38, further comprising: determining a quantity of feedback bits to encode for inclusion in the additional sidelink feedback message based at least in part on a resource pool; and encoding the first subset of feedback bits and the second subset of feedback bits using the erasure coding function based at least in part on the quantity of feedback bits.

Aspect 40: The method of any of aspects 35 through 39, further comprising: receiving control signaling indicating the erasure coding function, wherein the additional sidelink feedback message is transmitted based at least in part on receiving the control signaling.

Aspect 41: The method of any of aspects 35 through 40, further comprising: transmitting, to one or more user equipments (UEs) control signaling indicating the erasure coding function.

Aspect 42: The method of any of aspects 35 through 41, further comprising: receiving control signaling indicating a repetition factor for encoding feedback bits, wherein the additional sidelink feedback message is transmitted based at least in part on the repetition factor.

Aspect 43: The method of any of aspects 35 through 42, further comprising: transmitting or receiving control signaling indicating a feedback resource that the wireless device is to use for transmitting the additional sidelink feedback message.

Aspect 44: The method of any of aspects 35 through 43, further comprising: transmitting control signaling indicating a capability of to transmit encoded feedback.

Aspect 45: The method of aspect 44, wherein the capability indicates a maximum quantity of feedback bits that the wireless device is able to store in support of transmitting the encoded feedback.

Aspect 46: The method of any of aspects 35 through 45, wherein the wireless device is another UE or a network entity.

Aspect 47: An apparatus for wireless communications at a first UE, comprising a processor; memory coupled with the processor, with instructions stored in the memory, the instructions being executable by the processor to cause the apparatus to perform a method of any of aspects 1 through 17.

Aspect 48: An apparatus for wireless communications at a first UE, comprising at least one means for performing a method of any of aspects 1 through 17.

Aspect 49: A non-transitory computer-readable medium storing code for wireless communications at a first UE, the code comprising instructions executable by a processor to perform a method of any of aspects 1 through 17.

Aspect 50: An apparatus for wireless communications at a first user equipment, comprising a processor; memory coupled with the processor, with instructions stored in the memory, the instructions being executable by the processor to cause the apparatus to perform a method of any of aspects 18 through 34.

Aspect 51: An apparatus for wireless communications at a first user equipment, comprising at least one means for performing a method of any of aspects 18 through 34.

Aspect 52: A non-transitory computer-readable medium storing code for wireless communications at a first user equipment, the code comprising instructions executable by a processor to perform a method of any of aspects 18 through 34.

Aspect 53: An apparatus for wireless communications at a wireless device, comprising a processor; memory coupled with the processor, with instructions stored in the memory, the instructions being executable by the processor to cause the apparatus to perform a method of any of aspects 35 through 46.

Aspect 54: An apparatus for wireless communications at a wireless device, comprising at least one means for performing a method of any of aspects 35 through 46.

Aspect 55: A non-transitory computer-readable medium storing code for wireless communications at a wireless device, the code comprising instructions executable by a processor to perform a method of any of aspects 35 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described herein for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
at least one processor; and
at least one memory coupled with the at least one processor, with instructions stored in the at least one memory, when the instructions are executed by the at least one processor, individually or in any combination, cause the apparatus to:
generate a plurality of feedback bits corresponding to sidelink messages received via one or more sidelink channels, the plurality of feedback bits indicating a respective plurality of acknowledgements or negative acknowledgements for the sidelink messages;
transmit a first sidelink feedback message via a first feedback resource of a physical sidelink feedback channel occasion, the first sidelink feedback message comprising a first subset of feedback bits of the plurality of feedback bits; and
transmit at least two additional sidelink feedback messages via respective feedback resources, a first additional sidelink feedback message comprising both the first subset of feedback bits transmitted via the first sidelink feedback message and a second subset of feedback bits of the plurality of feedback bits included in a second sidelink feedback message, wherein the first subset of feedback bits are encoded with the second subset of feedback bits using an erasure coding function.

2. The apparatus of claim 1, wherein the instructions to transmit at least two additional sidelink message are executable by the at least one processor to cause the apparatus to:
transmit a second sidelink feedback message comprising the second subset of feedback bits; and
transmit the first additional sidelink feedback message comprising the first subset of feedback bits and the second subset of feedback bits encoded using the erasure coding function.

3. The apparatus of claim 1, wherein the instructions are further executable by the at least one processor to cause the apparatus to:
transmit a third sidelink feedback message comprising the first subset of feedback bits and the second subset of feedback bits encoded using a second erasure coding function.

4. The apparatus of claim 1, wherein the instructions are further executable by the at least one processor to cause the apparatus to:
receive control signaling indicating a quantity of feedback bits to encode for inclusion in the first additional sidelink feedback message; and
encode the first subset of feedback bits and the second subset of feedback bits using the erasure coding function based at least in part on the quantity of feedback bits.

5. The apparatus of claim 4, wherein the instructions to receive the control signaling are executable by the at least one processor to cause the apparatus to:
receive, from a second UE, a sidelink control information message indicating the quantity of feedback bits to encode.

6. The apparatus of claim 1, wherein the instructions are further executable by the at least one processor to cause the apparatus to:
determine a quantity of feedback bits to encode for inclusion in the first additional sidelink feedback message based at least in part on a resource pool; and
encode the first subset of feedback bits and the second subset of feedback bits using the erasure coding function based at least in part on based at least in part on the quantity of feedback bits.

7. The apparatus of claim 1, wherein the instructions to transmit the at least two additional sidelink feedback messages are executable by the at least one processor to cause the apparatus to:
transmit the first additional sidelink feedback message via a second feedback resource.

8. The apparatus of claim 7, wherein the first feedback resource and the second feedback resource comprise adjacent orthogonal frequency multiplexed symbols of the physical sidelink feedback channel occasion.

9. The apparatus of claim 7, wherein:
the first feedback resource comprises a first resource block of the physical sidelink feedback channel occasion with a first cyclic shift; and
the second feedback resource comprises the first resource block with a second cyclic shift.

10. The apparatus of claim 7, wherein:
the first feedback resource comprises a first resource block of the physical sidelink feedback channel occasion; and
the second feedback resource comprises a second resource block of the physical sidelink feedback channel occasion.

11. The apparatus of claim 7, wherein:
the first feedback resource comprises a first set of bits of the physical sidelink feedback channel occasion; and
the second feedback resource comprises a second set of bits that are adjacent to and follow the first set of bits of the physical sidelink feedback channel occasion.

12. The apparatus of claim 7, wherein the instructions to transmit the first additional sidelink feedback message via the second feedback resource are executable by the at least one processor to cause the apparatus to:
transmit the first additional sidelink feedback message in the second feedback resource of a second physical sidelink feedback channel occasion.

13. The apparatus of claim 1, wherein the instructions are further executable by the at least one processor to cause the apparatus to:
receive control signaling indicating a second feedback resource that is used to transmit the first additional sidelink feedback message, wherein the second feedback resource is different from the first feedback resource that is used to transmit the first sidelink feedback message.

14. The apparatus of claim 1, wherein the instructions are further executable by the at least one processor to cause the apparatus to:
receive control signaling indicating a repetition factor for encoding the plurality of feedback bits, wherein the at least two additional sidelink feedback messages are transmitted based at least in part on the repetition factor.

15. The apparatus of claim 1, wherein the instructions are further executable by the at least one processor to cause the apparatus to:
receive control signaling indicating the erasure coding function, wherein the first additional sidelink feedback message is transmitted based at least in part on receiving the control signaling.

16. The apparatus of claim 1, wherein the instructions are further executable by the at least one processor to cause the apparatus to:
receive, from a second UE or from a network entity, control signaling comprising a request for encoded feedback, wherein the first additional sidelink feedback message is transmitted based at least in part on receiving the request.

17. The apparatus of claim 1, wherein the instructions are further executable by the at least one processor to cause the apparatus to:
transmit, to a second wireless device, a request that the second wireless device transmit an encoded feedback transmission comprising the first subset of feedback bits and the second subset of feedback bits.

18. An apparatus for wireless communications at a first user equipment, comprising:
at least one processor; and
at least one memory coupled with the at least one processor, with instructions stored in the at least one memory, when the instructions are executed by the at least one processor, individually or in any combination, cause the apparatus to:
transmit at least one sidelink message via one or more sidelink channels;
receive a first sidelink feedback message via a first feedback resource of a physical sidelink feedback channel occasion the first sidelink feedback message comprising a first subset of feedback bits indicating a plurality of acknowledgements or negative acknowledgements corresponding to the at least one sidelink message; and
receive at least two additional sidelink feedback messages via respective feedback resources, a first additional sidelink feedback message comprising both the first subset of feedback bits received via the first sidelink feedback message and a second subset of feedback bits included in a second sidelink feedback message, wherein the first subset of feedback bits are encoded with the second subset of feedback bits using an erasure coding function.

19. The apparatus of claim 18, wherein the instructions to receive at least two additional sidelink feedback messages are executable by the at least one processor to cause the apparatus to:
receive a second sidelink feedback message comprising the second subset of feedback bits; and
receive the first additional sidelink feedback message comprising the first subset of feedback bits and the second subset of feedback bits encoded using the erasure coding function.

20. The apparatus of claim 18, wherein the instructions are further executable by the at least one processor to cause the apparatus to:
receive a third sidelink feedback message comprising the first subset of feedback bits and the second subset of feedback bits encoded using a second erasure coding function.

21. The apparatus of claim 18, wherein the instructions are further executable by the at least one processor to cause the apparatus to:
transmit or receive control signaling indicating a quantity of feedback bits that are to be encoded in the first additional sidelink feedback message; and
decode at least the first subset of feedback bits using the erasure coding function based at least in part on the quantity of feedback bits.

22. The apparatus of claim 21, wherein the instructions to transmit or receive the control signaling are executable by the at least one processor to cause the apparatus to:
transmit, to a first UE, a sidelink control information message indicating the quantity of feedback bits to encode.

23. The apparatus of claim 18, wherein the instructions are further executable by the at least one processor to cause the apparatus to:
determine a quantity of feedback bits that are to be encoded in the first additional sidelink feedback message based at least in part on a resource pool; and
decode at least the first subset of feedback bits using the erasure coding function based at least in part on the quantity of feedback bits.

24. The apparatus of claim 18, wherein the instructions to receive the at least two additional sidelink feedback messages are executable by the at least one processor to cause the apparatus to:
receive the first additional sidelink feedback message via a second feedback resource.

25. The apparatus of claim 24, wherein the first feedback resource and the second feedback resource comprise adjacent orthogonal frequency multiplexed symbols of the physical sidelink feedback channel occasion.

26. The apparatus of claim 24, wherein:
the first sidelink feedback message is received from a second UE; and
the first additional sidelink feedback message is received from a third UE or a network entity.

27. An apparatus for wireless communications at a wireless device, comprising:
at least one processor; and
at least one memory coupled with the at least one processor, with instructions stored in the at least one memory, when the instructions are executed by the at least one processor, individually or in any combination, cause the apparatus to:
monitor for a first sidelink feedback message comprising a first subset of feedback bits indicating a plurality of acknowledgements or negative acknowledgements corresponding to a first sidelink message and a second sidelink feedback message comprising a second subset of feedback bits indicating a plurality of acknowledgements or negative acknowledgements corresponding to a second sidelink message; and transmit an additional sidelink feedback message via a feedback resource, the additional sidelink feedback message comprising both the first subset of feedback bits and the second subset of feedback bits, wherein the first subset of feedback bits are encoded with the second subset of feedback bits using an erasure coding function.

28. The apparatus of claim 27, wherein the instructions are further executable by the at least one processor to cause the apparatus to:
receive, from a user equipment (UE), a request for encoded feedback, wherein the additional sidelink feedback message is transmitted based at least in part on receiving the request.

29. The apparatus of claim 28, wherein the instructions are further executable by the at least one processor to cause the apparatus to:
store the first subset of feedback bits and the second subset of feedback bits for a time period, wherein the request is received during the time period.

30. A method for wireless communications at a first user equipment (UE), comprising:
generating a plurality of feedback bits corresponding to sidelink messages received via one or more sidelink channels, the plurality of feedback bits indicating a respective plurality of acknowledgements or negative acknowledgements for the sidelink messages;
transmitting a first sidelink feedback message via a first feedback resource of a physical sidelink feedback channel occasion, the first sidelink feedback message comprising a first subset of feedback bits of the plurality of feedback bits; and
transmitting at least two additional sidelink feedback messages via respective feedback resources, a first additional sidelink feedback message comprising both the first subset of feedback bits transmitted via the first sidelink feedback message and a second subset of feedback bits of the plurality of feedback bits included in a second sidelink feedback message, wherein the first subset of feedback bits are encoded with the second subset of feedback bits using an erasure coding function.

* * * * *